US008842824B2

(12) United States Patent
Yamashita

(10) Patent No.: US 8,842,824 B2
(45) Date of Patent: Sep. 23, 2014

(54) ENCRYPTION PROCESSING CIRCUIT AND DECRYPTION PROCESSING CIRCUIT, METHODS THEREOF, AND PROGRAMS THEREOF

(71) Applicant: Noritaka Yamashita, Tokyo (JP)

(72) Inventor: Noritaka Yamashita, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 13/990,259

(22) PCT Filed: Nov. 27, 2012

(86) PCT No.: PCT/JP2012/080634
§ 371 (c)(1),
(2), (4) Date: May 29, 2013

(87) PCT Pub. No.: WO2013/080976
PCT Pub. Date: Jun. 6, 2013

(65) Prior Publication Data
US 2014/0112468 A1  Apr. 24, 2014

(30) Foreign Application Priority Data

Nov. 28, 2011 (JP) .................. 2011-258991

(51) Int. Cl.
*H04L 9/28* (2006.01)
*H04L 9/00* (2006.01)
*H04L 9/06* (2006.01)
*G09C 1/00* (2006.01)

(52) U.S. Cl.
CPC ............ *H04L 9/28* (2013.01); *H04L 2209/046* (2013.01); *H04L 2209/125* (2013.01); *H04L 2209/24* (2013.01); *H04L 9/003* (2013.01); *H04L 9/0618* (2013.01); *G09C 1/00* (2013.01)
USPC ............................. 380/28; 713/189

(58) Field of Classification Search
CPC ................................... H04L 9/28; H04L 9/06
USPC ................. 380/28, 29; 713/189, 193, 194
See application file for complete search history.

(56) References Cited

U.S. PATENT DOCUMENTS

2003/0140240 A1* 7/2003 Jaffe et al. ...................... 713/193
2004/0078588 A1* 4/2004 Chow et al. ................... 713/200

(Continued)

FOREIGN PATENT DOCUMENTS

JP     2007-96973 A    4/2007
JP     2007-195132 A   8/2007

(Continued)

OTHER PUBLICATIONS

Iwai et al., "Implementation and Verification of DPA-Resistant Cryptographic DES Circuit using Domino-RSL", 2011, IEEE, pp. 28-33.*

(Continued)

*Primary Examiner* — Matthew Smithers
(74) *Attorney, Agent, or Firm* — Sughrue Mion, PLLC

(57) ABSTRACT

An encryption processing circuit capable of inhibiting leakage of secret information from bit transitions of a register while inhibiting an increase in performance/area ratio is provided.
N (N is an integer equal to 2 or greater) sets, each of which including an encryption block and a register, are included, wherein an encryption block of an i-th set performs encryption in a certain step on plain text stored in the register of the i-th set or intermediate data stored in the register of the i-th set obtained from the plain text and the intermediate data obtained by the encryption is stored in the register of an (i+1)-th set and the encryption block of an N-th set performs the encryption in the certain step on plain text stored in the register of the N-th set or intermediate data stored in the register of the N-th set obtained from the plain text and the intermediate data obtained by the encryption is stored in the register of a first set.

6 Claims, 18 Drawing Sheets

(56) References Cited

U.S. PATENT DOCUMENTS

| | | | |
|---|---|---|---|
| 2007/0076864 A1* | 4/2007 | Hwang | 380/29 |
| 2010/0257373 A1 | 10/2010 | Motoyama | |
| 2010/0318811 A1 | 12/2010 | Motoyama | |

FOREIGN PATENT DOCUMENTS

| | | |
|---|---|---|
| JP | 2009-205161 A | 9/2009 |
| JP | 2010-232709 A | 10/2010 |
| JP | 2010-245881 A | 10/2010 |
| JP | 2010-288233 A | 12/2010 |
| JP | 2011-169977 A | 9/2011 |

OTHER PUBLICATIONS

Ambrose et al., MUTE-AES: A Multiprocessor Architecture to prevent Power Analysis based Side Channel Attack of the AES Algorithm, 2008, IEEE, pp. 678-684.*

McEvoy et al., "Isolated WDDL: A Hiding Countermeasure for Differential Power Analysis on FPGAs", Mar. 2009, ACM Transactions on Reconfigurable Technology and Systems, vol. 2, No. 1, Article 3, pp. 1-23.*

Paul Kocher et al., "Introduction to Differential Power Analysis and Related Attacks", Cryptography Research, 1998, pp. 1-5.

Eric Brier et al., "Correlation Power Analysis with a Leakage Model", CHES 2004, pp. 16-29, LNCS 3156.

Kris Tiri et al., "A Logic Level Design Methodology for a Secure DPA Resistant ASIC or FPGA Impelementation", Proceedings of the Design, Automation and Test in Europe Conference and Exhibition, 2004, 6 pgs.

International Search Report for PCT/JP2012/080634 dated Feb. 12, 2013.

* cited by examiner

ENCRYPTION PROCESSING CIRCUIT AND DECRYPTION PROCESSING CIRCUIT, METHODS THEREOF, AND PROGRAMS THEREOF

CROSS REFERENCE TO RELATED APPLICATIONS

This application is a National Stage of International Application No. PCT/JP2012/080634 filed Nov. 27, 2012, claiming priority based on Japanese Patent Application No. 2011-258991 filed Nov. 28, 2011 the contents of all of which are incorporated herein by reference in their entirety.

TECHNICAL FIELD

The present invention relates to an encryption processing circuit and a decryption processing circuit, methods thereof, and programs thereof, and in particular, relates to an encryption processing circuit and a decryption processing circuit having tamper resistance that makes side channel attacks difficult, methods thereof, and programs thereof.

BACKGROUND ART

As more information is converted into electronic data, cryptography has become an indispensable technology for protection of information and confidential communication. To secure the safety of ciphers, it is necessary to make secret information such as a key not easily inferable. Though cryptanalysis methods such as the exhaustive search of a key, linear decryption that performs mathematical decryption, and differential decryption are known, such an analysis in a realistic time frame is considered to be impracticable.

On the other hand, side channel attacks trying to acquire confidential information from side channel information under the assumption that an attacker can precisely measure side channel information such as the processing time and power consumption in an apparatus (cryptographic module) such as a mobile terminal equipped with a cryptographic function and measures against such attacks have become an important subject of research.

Side channel attacks include a power analysis attack that measures power consumption of a cryptographic module to analyze secret information such as a key from the power consumption. Among others, the differential power analysis that carries out an analysis by performing statistical processing on a plurality of power consumption wave forms is considered to be a particularly powerful attack method (NPL 1).

When cipher text is generated by performing preset encryption processing a predetermined number of times, the bit transition (Hamming distance) and power consumption of a register are considered to be correlated before and after the encryption processing (NPL 2).

Thus, a problem that a secret key can be analyzed by focusing on the bit transition arises.

As an example of techniques of measures against attacks focusing on the bit transition, Wave Differential Dynamic Logic (hereinafter, abbreviated as "WDDL") is proposed (NPL 3). In WDDL, after a precharge operation is performed, an operation is performed by using a complementary circuit to equalize power consumption. Measures against the differential power analysis are implemented by eliminating differences of power consumption due to differences of bit values during operation. A precharge is needed as an operation in WDDL and the operating speed is correspondingly decreased for the precharge. Moreover, a complementary circuit is needed and the circuit area is increased. As a result, a problem of a lower performance/area ratio arises in WDDL.

PTL 1 discloses a cipher processing apparatus having tamper resistance to DPA (Differential Power Analysis) attacks by being configured to connect two round operation circuits in series to perform cipher processing operations by alternately switching a normal round operation to which a normal round key is applied and a dummy round operation to which a dummy round key is applied.

PTL 2 discloses a technology that divides plain text into a plurality of blocks and performs pipeline processing by a CPU to encrypt each block when each block is independently encrypted.

CITATION LIST

Patent Literature

{PTL 1} Japanese Patent Application Laid-Open No. 2007-195132
{PTL 2} Japanese Patent Application Laid-Open No. 2009-205161

Non-Patent Literature

{NPL 1} P. Kocher, J. Jaffe and B. Jun, "Introduction to Differential Power Analysis and Related Attacks," 1998.
{NPL 2} E. Brier, C. Clavier, and F. Olivier, "Correlation Power Analysis with a Leakage Model," 2004.
{NPL 3} Kris Tiri, Ingrid Verbauwhede, "A Logic Level Design Methodology for a Secure DPA Resistant ASIC or FPGA Implementation", 2004.

SUMMARY OF INVENTION

Technical Problem

In the invention described in PTL 1, though the throughput does not decrease, the circuit nearly doubles in size and therefore, the performance/area ratio falls to about 1/2.

According to pipeline processing in the invention described in PTL 2, as will be described later, tamper resistance to side channel attacks is weak.

An object of the present invention is to provide an encryption processing circuit and a decryption processing circuit capable of inhibiting leakage of secret information from bit transitions of a register while inhibiting an increase in performance/area ratio, methods thereof, and programs thereof.

Solution to Problem

According to a first aspect of the present invention, an encryption processing circuit that encrypts plain text in a plurality of steps by using a cryptographic key, including N (N is an integer equal to 2 or greater) sets, each of which including an encryption block and a register, wherein the encryption block of an i-th (i=1 to N−1) set performs encryption in a certain step on plain text stored in the register of the i-th set or intermediate data stored in the register of the i-th set obtained from the plain text and the intermediate data obtained by the encryption is stored in the register of an (i+1)-th set and the encryption block of an N-th set performs the encryption in the certain step on plain text stored in the register of the N-th set or intermediate data stored in the register of the N-th set obtained from the plain text and the intermediate data obtained by the encryption is stored in the register of a first set is provided.

According to a second aspect of the present invention, a decryption processing circuit that decrypts cipher text in a plurality of steps by using a cryptographic key, including N (N is an integer equal to 2 or greater) sets, each of which including a decryption block and a register, wherein the decryption block of an i-th (i=1 to N−1) set performs decryption in a certain step on cipher text stored in the register of the i-th set or intermediate data stored in the register of the i-th set obtained from the cipher text and the intermediate data obtained by the decryption is stored in the register of an (i+1)-th set and the decryption block of an N-th set performs the decryption in the certain step on cipher text stored in the register of the N-th set or intermediate data stored in the register of the N-th set obtained from the cipher text and the intermediate data obtained by the decryption is stored in the register of a first set is provided.

According to a third aspect of the present invention, an encryption processing method of encrypting plain text in a plurality of steps by using a cryptographic key, wherein N (N is an integer equal to 2 or greater) sets, each of which including an encryption block and a register, are used, the encryption block of an i-th (i=1 to N−1) set performs encryption in a certain step on plain text stored in the register of the i-th set or intermediate data stored in the register of the i-th set obtained from the plain text and the intermediate data obtained by the encryption is stored in the register of an (i+1)-th set, and the encryption block of an N-th set performs the encryption in the certain step on plain text stored in the register of the N-th set or intermediate data stored in the register of the N-th set obtained from the plain text and the intermediate data obtained by the encryption is stored in the register of a first set is provided.

According to a fourth aspect of the present invention, a decryption processing method of decrypting cipher text in a plurality of steps by using a cryptographic key, wherein N (N is an integer equal to 2 or greater) sets, each of which including a decryption block and a register, are used, the decryption block of an i-th (i=1 to N−1) set performs decryption in a certain step on cipher text stored in the register of the i-th set or intermediate data stored in the register of the i-th set obtained from the cipher text and the intermediate data obtained by the decryption is stored in the register of an (i+1)-th set, and the decryption block of an N-th set performs the decryption in the certain step on cipher text stored in the register of the N-th set or intermediate data stored in the register of the N-th set obtained from the cipher text and the intermediate data obtained by the decryption is stored in the register of a first set is provided.

According to a fifth aspect of the present invention, an encryption processing program causing a computer to function as an encryption processing circuit that encrypts plain text in a plurality of steps by using a cryptographic key, wherein the encryption processing circuit includes N (N is an integer equal to 2 or greater) sets, each of which including an encryption block and a register, code is contained so that the encryption block of an i-th (i=1 to N−1) set performs encryption in a certain step on plain text stored in the register of the i-th set or intermediate data stored in the register of the i-th set obtained from the plain text and the intermediate data obtained by the encryption is stored in the register of an (i+1)-th set in the encryption processing circuit, and code is contained so that the encryption block of an N-th set performs the encryption in the certain step on plain text stored in the register of the N-th set or intermediate data stored in the register of the N-th set obtained from the plain text and the intermediate data obtained by the encryption is stored in the register of a first set in the encryption processing circuit is provided.

According to a sixth aspect of the present invention, a decryption processing program causing a computer to function as a decryption processing circuit that decrypts cipher text in a plurality of steps by using a cryptographic key, wherein the decryption processing circuit includes N (N is an integer equal to 2 or greater) sets, each of which including a decryption block and a register, code is contained so that the decryption block of an i-th (i=1 to N−1) set performs decryption in a certain step on cipher text stored in the register of the i-th set or intermediate data stored in the register of the i-th set obtained from the cipher text and the intermediate data obtained by the decryption is stored in the register of an (i+1)-th set in the decryption processing circuit, and code is contained so that the decryption block of an N-th set performs the decryption in the certain step on cipher text stored in the register of the N-th set or intermediate data stored in the register of the N-th set obtained from the cipher text and the intermediate data obtained by the decryption is stored in the register of a first set in the decryption processing circuit is provided.

Advantageous Effects of Invention

According to the present invention, leakage of secret information from bit transitions of a register can be inhibited while an increase in performance/area ratio being inhibited.

REFERENCE SIGNS LIST

Figure 1:
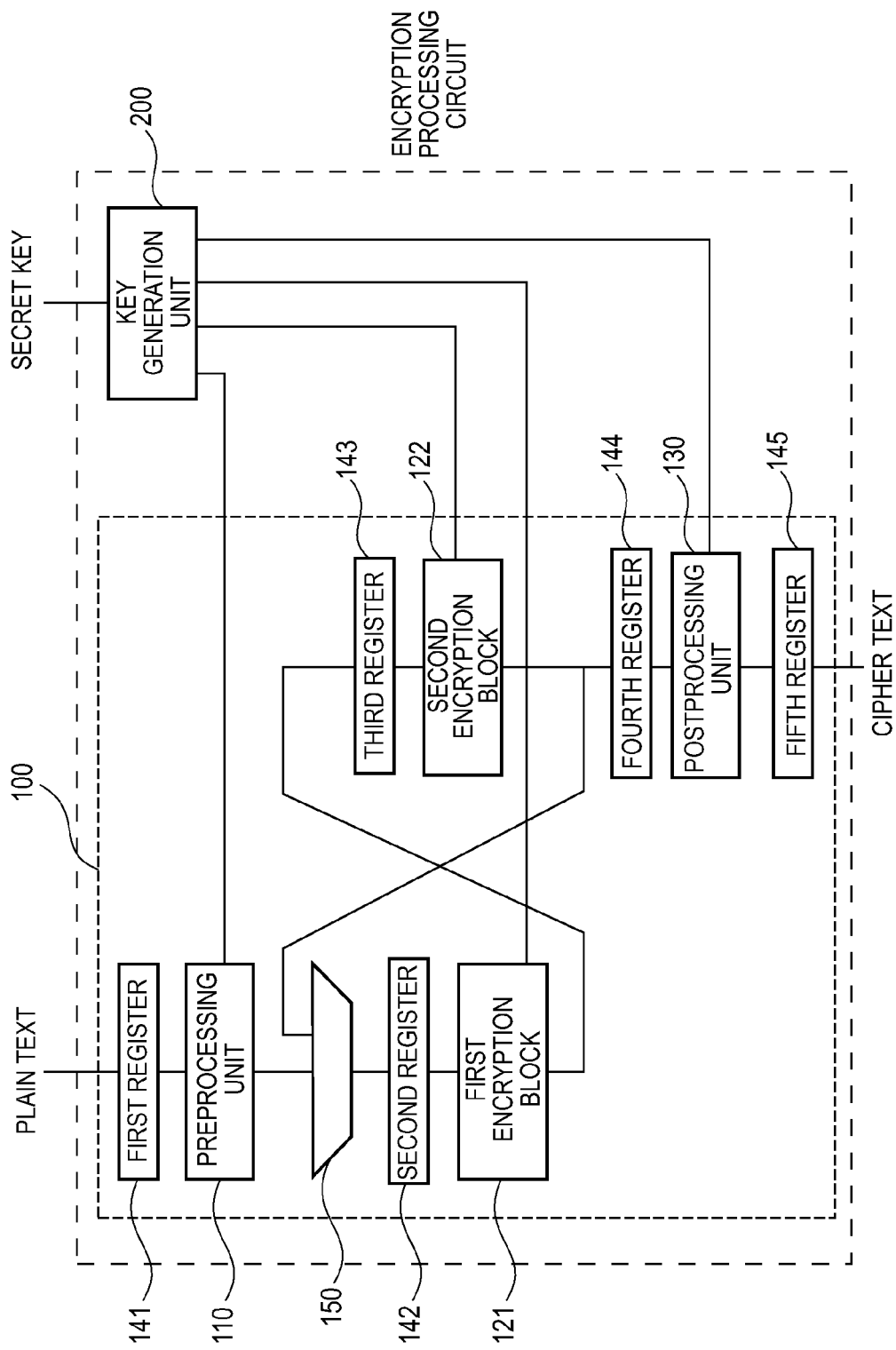
FIG. 1 A figure illustrates an outline block diagram of an encryption processing circuit according to a first embodiment of the present invention.

100 Encryption unit
110 Preprocessing unit
111 First preprocessing unit
112 Second preprocessing unit
113 Preprocessing unit (exclusive OR circuit)
121 First encryption block
122 Second encryption block
123 Third encryption block
130 Postprocessing unit
131 First postprocessing unit
132 Second postprocessing unit
141 First register
142 Second register
143 Third register
144 Fourth register
145 Fifth register
146 Sixth register
147 Seventh register
148 Eighth register
150 Selector
151 First selector
152 Second selector
200 Key generation unit
211 First key scheduling unit
212 Second key scheduling unit
221 First key register
222 Second key register
223 Third key register
231 Selector
232 Selector
233 Selector
234 Selector

DESCRIPTION OF EMBODIMENTS

The embodiments to carry out the present invention will be described in detail below with reference to the drawings.

To achieve the above subject, a cryptographic module in the present invention includes an encryption processing circuit.

The encryption processing unit includes a plurality of encryption blocks and registers and each time one step of processing is completed, the processing is repeated by using a different encryption block and register.

In addition, other data is processed in parallel by using another encryption block and register.

First Embodiment

A basic configuration of the present invention is shown in FIG. 1.

An encryption processing circuit according to the present embodiment includes an encryption unit 100 and a key generation unit 200.

The encryption unit 100 includes a preprocessing unit 110, a first encryption block 121, a second encryption block 122, a postprocessing unit 130, data registers 141 to 145, and a selector 150.

The encryption unit 100 has a function, based on input data and a cryptographic key received from the key generation unit 200, to encrypt the data to output cipher text.

The preprocessing unit 110 has a function to perform processing prior to loop processing performed in a subsequent encryption block in encryption processing. For example, processing to obtain an exclusive OR of a secret key and plain text prior to round processing in AES and providing a function of IP processing in DES can be considered. When plain text is input by being divided, storing data in the preprocessing unit 110 can also be considered. In that case, when a fixed amount of data is stored in the preprocessing unit 110, the data is sent to the subsequent encryption block. Incidentally, a configuration that does not include the preprocessing unit 110 can also be considered.

The first encryption block 121 has a function to receive data from the prior second register 142, perform one step of encryption processing, and output data to the subsequent third register 143. Similarly, the second encryption block 122 has a function to receive data from the prior third register 143, perform one step of encryption processing, and output data to the subsequent second register 142 and fourth register 144. In AES, for example, round processing of SubByte, ShiftRow, MixColumn, and AddRoundKey is regarded as processing of one step and one step of processing is alternately performed by the first encryption block 121 and the second encryption block 122.

The postprocessing unit 130 has a function to perform processing subsequent to loop processing performed in the prior first encryption block 121 and second encryption block 122 in encryption processing. In DES, for example, providing a function of FP processing to the postprocessing unit 130 can be considered. When cipher text cannot be output at a time, storing the cipher text in the postprocessing unit 130 can be considered so that the cipher text can be output as a block at a time after being divided into blocks. Incidentally, a configuration that does not include the postprocessing unit can also be considered.

The first register 141 has a function to temporarily store input data input from an input unit. The second register 142 has a function to temporarily store a processing result in the second encryption block 122. The third register 143 has a function to temporarily store a processing result in the first encryption block 121. The fourth register 144 has a function to temporarily store a processing result by the last step during loop processing in the second encryption block 122. The fifth register 145 has a function to temporarily store a processing result by the postprocessing unit 130.

The key generation unit 200 has a function to generate a key used by the encryption unit 100 based on an input secret key. In the encryption unit 100, in addition to the first and second encryption blocks 121, 122, a key is used also in the preprocessing unit 110 and the postprocessing unit 130. Thus, the key generation unit 200 generates a plurality of keys fitted to each piece of processing and outputs the generated keys to the encryption unit 100.

A method of generating and preserving all keys to be used in advance before starting processing by the encryption unit 100 and outputting the preserved keys for processing by the encryption unit 100 and a method of generating and outputting a key in parallel with processing by the encryption unit 100 can be considered as generation methods of keys. Incidentally, a configuration in which as many the key generation units 200 as the number of encryption blocks are provided and each of the key generation units 200 generates keys for the corresponding encryption block can also be considered.

In the configuration in FIG. 1, data is input into the first encryption block 121 from the preprocessing unit 110 and data is output to the postprocessing unit 130 from the second encryption block 122, but the connection positions of the preprocessing unit 110 and the postprocessing unit 130 may be changed depending on the number of times of encryption processing. In the configuration in FIG. 1, for example, the postprocessing unit 130 is located subsequent to the second encryption block 122, but if the number of times of encryption processing is odd, the configuration is changed so that the postprocessing unit 130 is located subsequent to the first encryption block 121.

Figure 2:
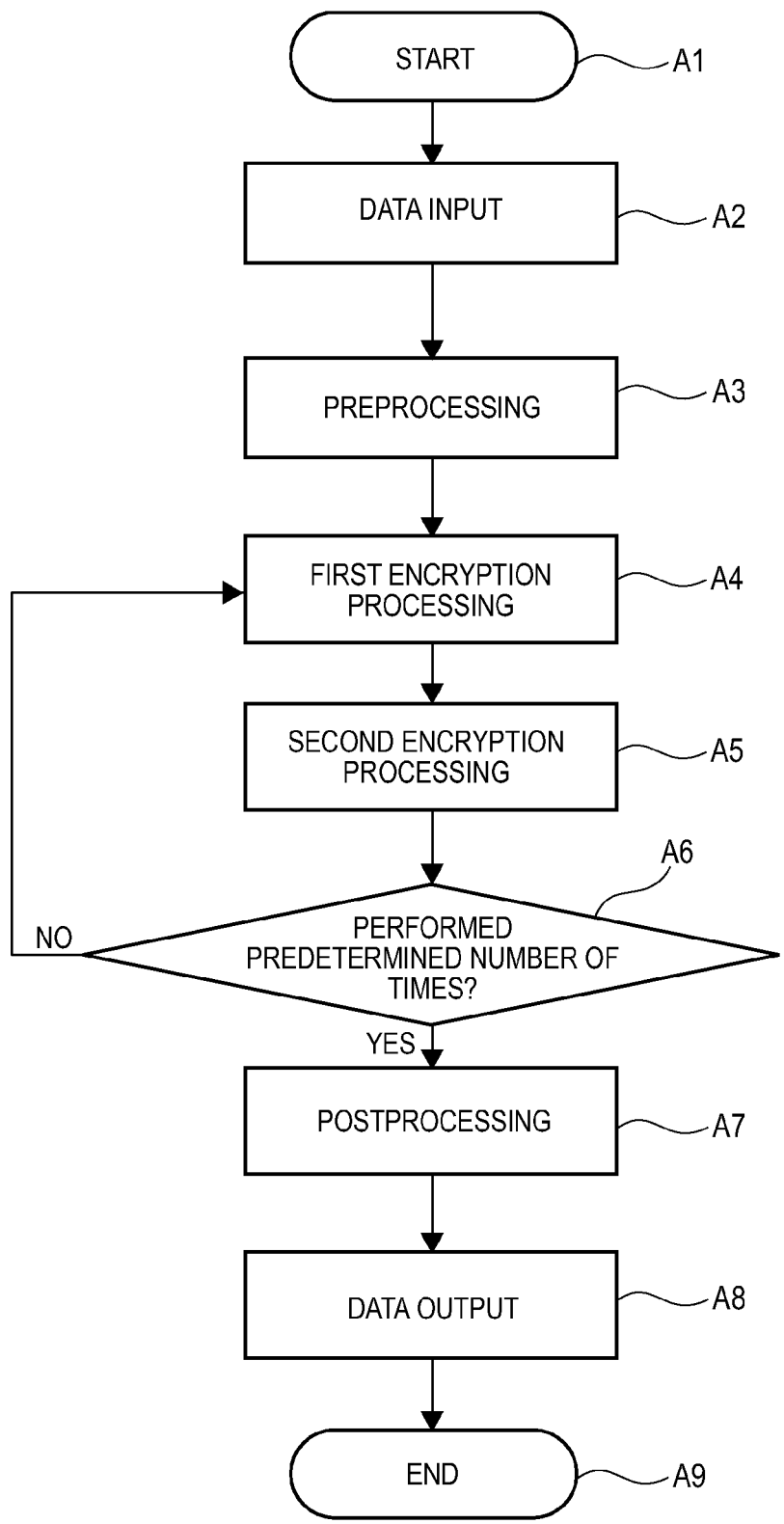
FIG. 2 A figure illustrates an operation flow of the encryption processing circuit according to the first embodiment of the present invention.
Figure 3:
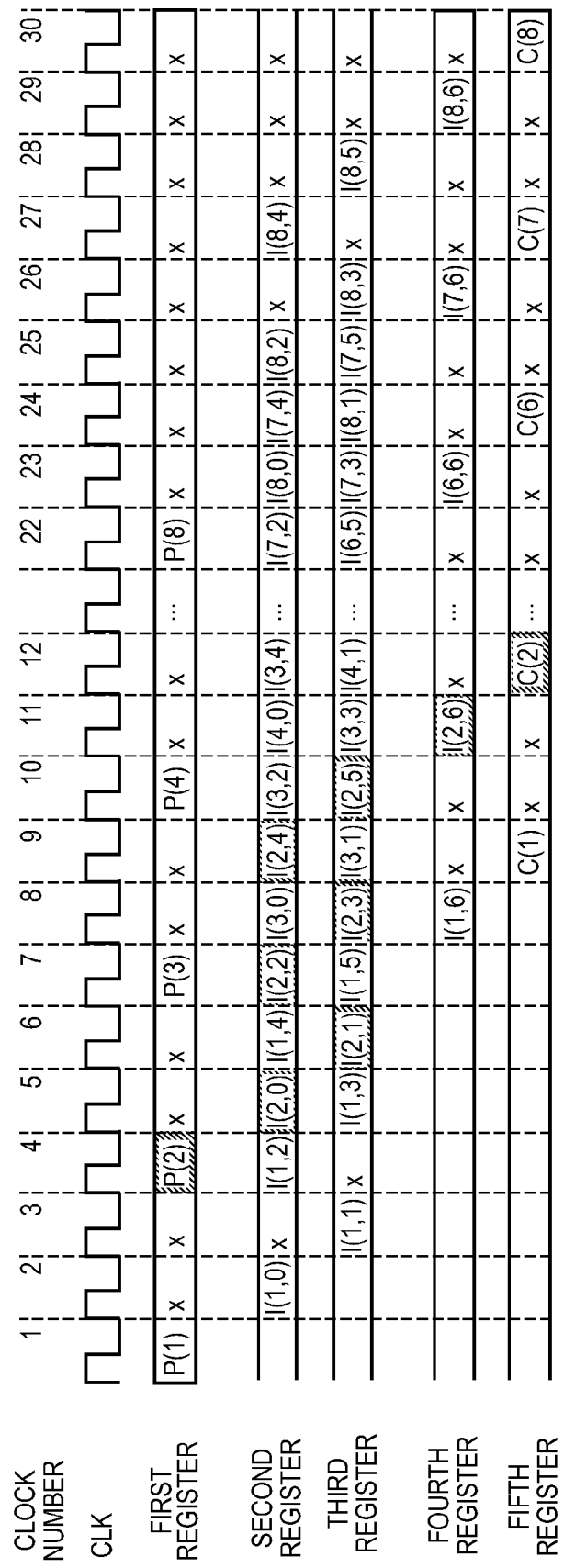
FIG. 3 A figure illustrates a timing chart of the encryption processing circuit according to the first embodiment of the present invention.

Next, the encryption method in the present embodiment will be described by using FIGS. 2 and 3. FIG. 2 illustrates a flow chart when one piece of data is focused on. FIG. 3 illustrates a timing chart in the whole encryption processing circuit.

First, the description will be provided by using FIG. 2 and focusing on one piece of data to be encrypted (hereinafter, mentioned as "plain text"). When encryption processing is started (step A1), plain text is input into an encryption processing circuit and the first register 141 stores the plain text (step A2).

The plain text stored in the first register 141 is input into the preprocessing unit 110. The preprocessing unit 110 performs preprocessing on the plain text. The preprocessed plain text passes through the selector 150 before being stored in the second register 142 (step A3).

Next, the first encryption block 121 performs one step of the encryption processing. The third register 143 stores the processing result (step A4).

Further, the next second encryption block 122 performs one step of the encryption processing. The second register 142 stores the processing result (step A5).

A control unit (not illustrated) determines whether the number of steps of the encryption processing performed thus far satisfies the predetermined number of times (step A6).

If the predetermined number of times is not satisfied, steps A4 and A5 are repeated.

If the predetermined number of times is satisfied, the postprocessing unit 130 performs postprocessing, thereby generating cipher text (step A7).

Lastly, the fifth register 145 outputs the cipher text (step A8), completing the encryption processing on the plain text input into the encryption processing circuit (step A9).

If the number of times of the encryption processing is odd, step A6 is performed between steps A4 and A5.

Next, processing in the whole encryption processing circuit will be described by using the timing chart in the encryption processing circuit of FIG. 3. Incidentally, it is assumed that keys in accordance with processing are sent to the preprocessing unit 110, the first encryption block 121, the second encryption block 122, and the postprocessing unit 130 from the key generation unit 200. In the timing chart, P(i) is i-th plain text data, I(i, 0) is data obtained after preprocessing on i-th plain text, I(i, k) is data obtained after the k-th step of encryption processing on i-th plain text, and C(i) is cipher text obtained after preprocessing, repeated encryption processing, and postprocessing on i-th plain text. x is undefined data. The example is assumed to be encryption processing containing a total of ten steps, one step of input processing, one step of preprocessing, six steps of encryption processing, one step of postprocessing, and one step of output processing. In this case, the next plain is input in every three steps. The timing chart when eight pieces of plain text are encrypted will be described below.

In the description that follows, it is assumed that plain text of a predetermined number is input into the encryption processing circuit in a predetermined clock and timing adjustments therefor are made by, for example, a timing adjustment circuit located prior to the encryption processing circuit. For example, the timing adjustment circuit successively reads plain text from the storage unit where the plain text is stored at intervals of the predetermined clock and supplies the plain text to the encryption processing circuit. The timing adjustment circuit may be contained in the encryption processing circuit.

At clock CLK1, the first plain text P(1) is input into the encryption processing circuit. The first register 141 stores the plain text P(1).

At clock CLK2, the preprocessing unit 110 performs preprocessing on the plain text P(1). The second register 142 stores data I(1, 0).

At clock CLK3, the first encryption block 121 performs the first step of encryption processing on the data I(1, 0). The third register 143 stores data I(1, 1).

At clock CLK4, the second encryption block 122 performs the second step of the encryption processing on the data I(1, 1). The second register 142 stores data I(1, 2).

At clock CLK4, the second plain text P(2) is input into the encryption processing circuit. The first register 141 stores the plain text P(2).

At clock CLK5, the first encryption block 121 performs the third step of the encryption processing on the data I(1, 2). The third register 143 stores data I(1, 3).

Also at clock CLK5, the preprocessing unit 110 performs preprocessing on the plain text P(2). The second register 142 stores data I(2, 0).

At clock CLK6, the second encryption block 122 performs the fourth step of the encryption processing on the data I(1, 3). The second register 142 stores data I(1, 4).

Also at clock CLK6, the first encryption block 121 performs the first step of the encryption processing on the data I(2, 0). The third register 143 stores data I(2, 1).

At clock CLK7, the first encryption block 121 performs the fifth step of the encryption processing on the data I(1, 4). The third register 143 stores data I(1, 5).

Also at clock CLK7, the second encryption block 122 performs the second step of the encryption processing on the data I(2, 1). The second register 142 stores data I(2, 2).

Further at clock CLK7, the third plain text P(3) is input into the encryption processing circuit. The first register 141 stores the plain text P(3).

At clock CLK8, the second encryption block 122 performs the sixth step of the encryption processing on the data I(1, 5) and the fourth register 144 stores data I(1, 6).

Also at clock CLK8, the first encryption block 121 performs the third step of the encryption processing on the data I(2, 2) and the third register 143 stores data I(2, 3).

Further at clock CLK8, the preprocessing unit 110 performs preprocessing on the plain text P(3). The second register 142 stores data I(3, 0).

At clock CLK9, the postprocessing unit 130 performs postprocessing on the data I(1, 6). The fifth register 145 stores cipher text C(1).

Also at clock CLK9, the second encryption block 122 performs the fourth step of the encryption processing on the data I(2, 3). The second register 142 stores data I(2, 4).

Further at clock CLK9, the first encryption block 121 performs the first step of the encryption processing on the data I(3, 0). The third register 143 stores data I(3, 1).

At clock CLK10, the fifth register 145 outputs cipher text C(1) as an encryption result on the plain text P(1).

Also at clock CLK10, the first encryption block 121 performs the fifth step of the encryption processing on the data I(2, 4). The third register 143 stores data I(2, 5).

Further at clock CLK10, the second encryption block 122 performs the second step of the encryption processing on the data I(3, 1). The second register 142 stores data I(3, 2).

Further at clock CLK10, the fourth plain text P(4) is input into the encryption processing circuit. The first register 141 stores the plain text P(4).

Also at clock CLK11, the second encryption block 122 performs the sixth step of the encryption processing on the data I(2, 5). The fourth register 144 stores data I(2, 6).

At clock CLK11, the first encryption block 121 performs the third step of the encryption processing on the data I(3, 2). The third register 143 stores data I(3, 3).

Further at clock CLK11, the preprocessing unit 110 performs preprocessing on the plain text P(4). The second register 142 stores data I(4, 0).

At clock CLK12, the postprocessing unit 130 performs postprocessing on the data I(2, 6). The fifth register 145 stores cipher text C(2).

Also at clock CLK12, the second encryption block 122 performs the fourth step of the encryption processing on the data I(3, 3). The second register 142 stores data I(3, 4).

Further at clock CLK12, the first encryption block 121 performs the first step of the encryption processing on the data I(4, 1). The third register 143 stores data I(4, 1).

At clocks CLK13 to 21, input, preprocessing, encryption processing, postprocessing, and output are successively performed.

At clock CLK22, the first encryption block 121 performs the fifth step of the encryption processing on data I(6, 4). The third register 143 stores data I(6, 5).

Also at clock CLK22, the second encryption block 122 performs the second step of the encryption processing on data I(7, 1). The second register 142 stores data I(7, 2).

Further at clock CLK22, the eighth plain text P(8) is input into the encryption processing circuit and the first register 141 stores the plain text P(8).

At clock CLK23, the second encryption block 122 performs the sixth step of the encryption processing on the data I(6, 5). The fourth register 144 stores data I(6, 6).

Also at clock CLK23, the first encryption block 121 performs the third step of the encryption processing on the data I(7, 2). The third register 143 stores data I(7, 3).

Further at clock CLK23, the preprocessing unit 110 performs preprocessing on the plain text P(8). The second register 142 stores data I(8, 0).

At clock CLK24, the postprocessing unit 130 performs postprocessing on the data I(6, 6). The fifth register 145 stores cipher text C(6).

Also at clock CLK24, the second encryption block 122 performs the fourth step of the encryption processing on the data I(7, 3). The second register 142 stores data I(7, 4).

Further at clock CLK24, the first encryption block 121 performs the first step of the encryption processing on the data I(8, 0). The third register 143 stores data I(8, 1).

At clock CLK25, the fifth register 145 outputs cipher text C(6) as an encryption result on the plain text P(6).

Also at clock CLK25, the first encryption block 121 performs the fifth step of the encryption processing on the data I(7, 4). The third register 143 stores data I(7, 5).

Further at clock CLK25, the second encryption block 122 performs the second step of the encryption processing on the data I(8, 1). The second register 142 stores data I(8, 2).

At clock CLK26, the second encryption block 122 performs the sixth step of the encryption processing on the data I(7, 5). The fourth register 144 stores data I(7, 6).

At clock CLK26, the first encryption block 121 performs the third step of the encryption processing on the data I(8, 2). The third register 143 stores data I(8, 3).

At clock CLK27, the postprocessing unit 130 performs postprocessing on the data I(7, 6). The fifth register 145 stores cipher text C(7).

Also at clock CLK27, the second encryption block 122 performs the fourth step of the encryption processing on the data I(8, 3). The second register 142 stores data I(8, 4).

At clock CLK28, the fifth register 145 outputs cipher text C(7) as an encryption result on the plain text P(7).

Also at clock CLK28, the first encryption block 121 performs the fifth step of the encryption processing on the data I(8, 4). The third register 143 stores data I(8, 5).

Also at clock CLK29, the second encryption block 122 performs the sixth step of the encryption processing on the data I(8, 5). The fourth register 144 stores data I(8, 6).

At clock CLK30, the postprocessing unit 130 performs postprocessing on the data I(8, 6). The fifth register 145 stores cipher text C(8).

At clock CLK31, the fifth register 145 outputs cipher text C(8) as an encryption result on the plain text P(8).

With the above 31 clocks encryption of eight pieces of plain text is completed.

Undefined places in the timing chart mean preserving the processing result immediately before as is, storing dummy data of a random number or fixed number, or continuing encryption processing to preserve the result. Continuing encryption processing means continuing to perform encryption on some kind of data in an unused encryption block to store the result in a register.

For example, in FIG. 3, one of the encryption blocks and registers are unused at CLK26 and thereafter and the following processing will be performed.

At clock CLK26, the second register 142 stores data I(7, 6).

At clock CLK27, the first encryption block 121 performs encryption processing on the data I(7, 6). The third register 143 stores the result thereof.

At clock CLK28, the second encryption block 122 further performs encryption processing on the above result of the encryption processing by the first encryption block 121. The second register 142 stores the result thereof.

An encryption processing circuit according to the present embodiment will be compared with a circuit for sequential processing in which encryption processing is performed by one encryption block. The circuit illustrated in FIG. 4 can be considered as an ordinary circuit for sequential processing. Compared with this circuit, the circuit (FIG. 1) in the present embodiment has the third register 143 and the second encryption block 122 added thereto. When the encryption block is a main component of an encryption processing circuit, compared with the size of the circuit in FIG. 4, the circuit (FIG. 1) in the present embodiment approximately doubles in size.

Figure 4:
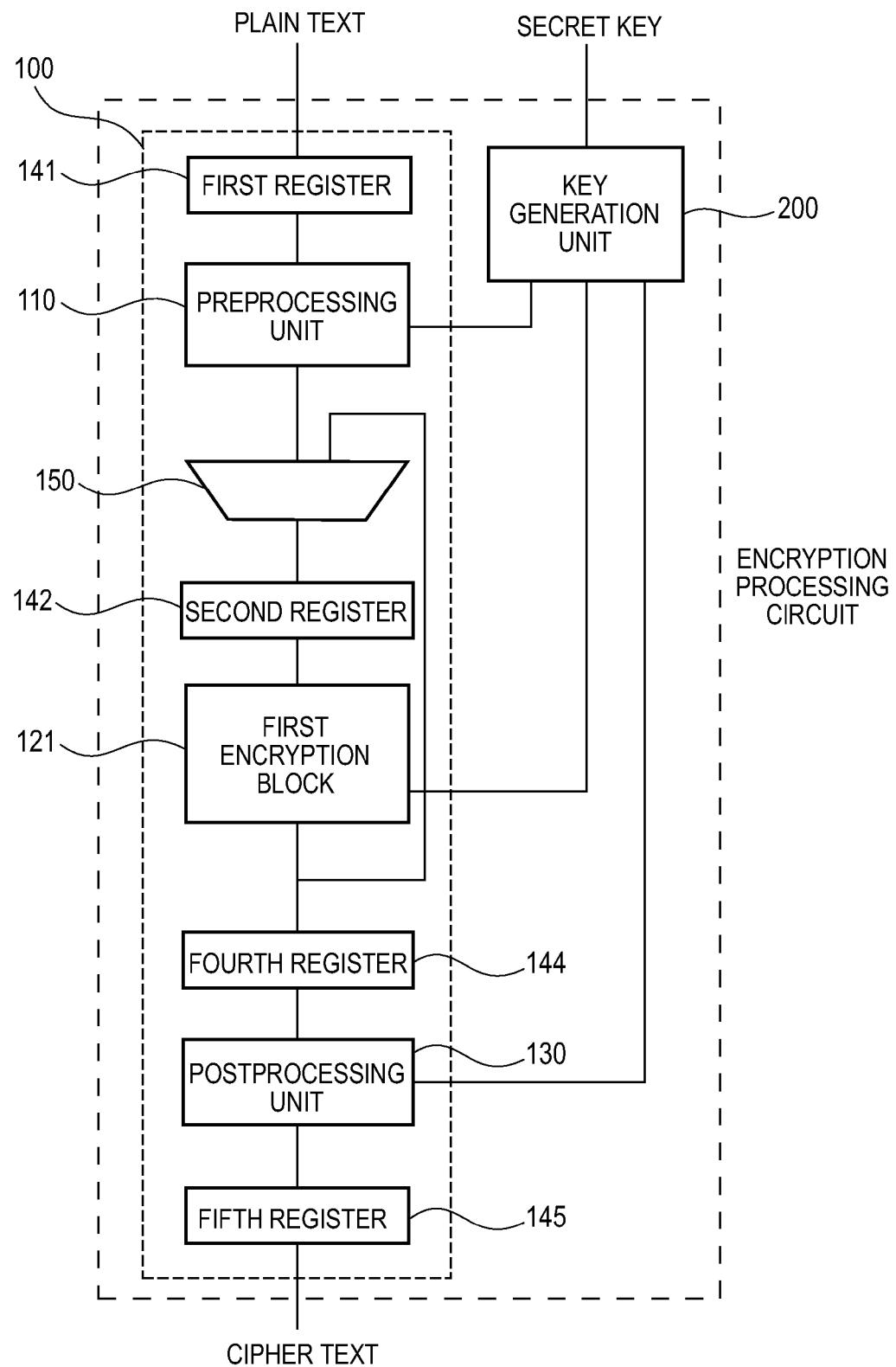
FIG. 4 A figure illustrates an outline block diagram of the encryption processing circuit that performs normal sequential processing.
Figure 5:
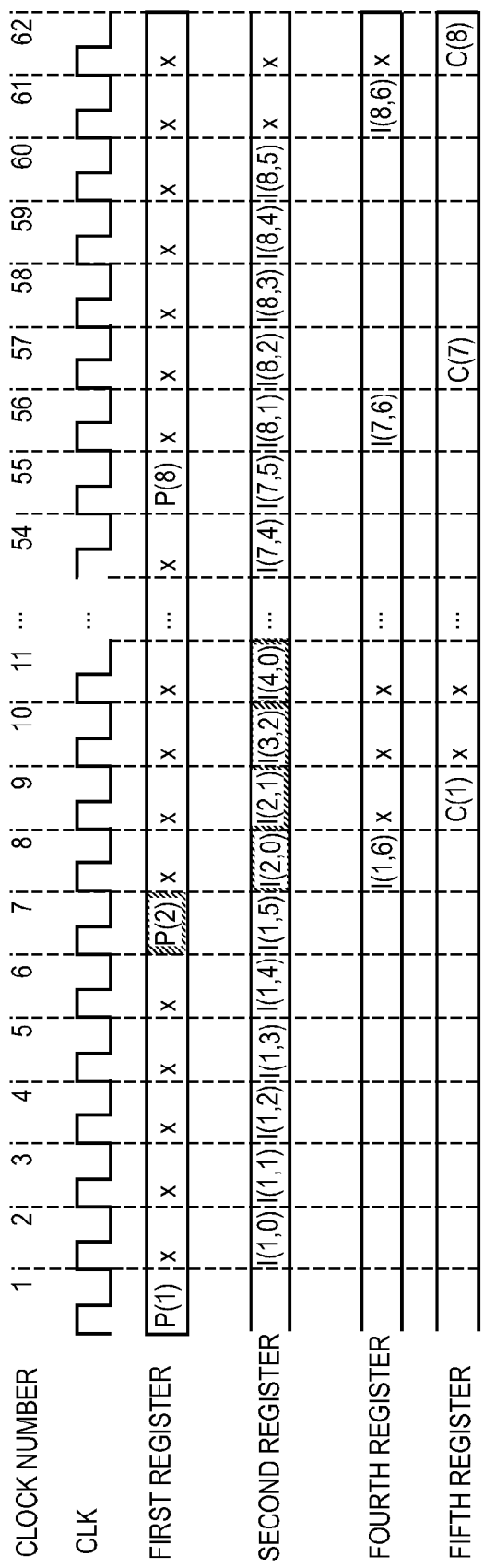
FIG. 5 A figure illustrates a timing chart of the encryption processing circuit that performs sequential processing.

Next, when eight pieces of plain text are sequentially processed, the circuit for sequential processing illustrated in FIG. 4 needs up to 80 clocks as the processing time and 62 clocks when input/output of one piece of data and encryption processing of another piece of data can performed at the same time (see FIG. 5). On the other hand, two encryption blocks operate at the same time in the present embodiment and the processing speed is improved by each of the encryption blocks being used for different data processing.

Therefore, compared with the encryption processing circuit for sequential processing in FIG. 4, the encryption processing circuit in the present embodiment in FIG. 1 has twice the circuit area, but the processing speed thereof is also twice and therefore, the performance/area ratio is roughly equivalent.

Next, tamper resistance in the present embodiment will be described.

When sequential processing is performed by the ordinary circuit in FIG. 4, if focused on each piece of processing for the same data, data before processing is written into the second register 142 at some clock and the data after the processing is written into the same second register 142 at the next clock. Therefore, when a comparison is made before and after processing of each step of encryption, a correlation arises between a physical bit transition (or a Hamming distance) of the second register 142 and a bit transition (or a Hamming distance) of data itself to be encrypted. In addition, a physical bit transition (or a Hamming distance) of the second register 142 and power consumption are correlated. Therefore, a bit transition (or a Hamming distance) of data itself to be encrypted and power consumption are correlated. Then, by analyzing power consumption and further using the correlation between a bit transition (or a Hamming distance) of data itself to be encrypted and power consumption, it becomes possible to estimate a bit transition (or a Hamming distance) of data itself to be encrypted and based on the bit transition, to estimate a secret key.

From the timing chart in FIG. 3, on the other hand, when one step of encryption processing is performed on data stored in the second register 142 by the circuit in FIG. 1, it is clear that the processed data is stored in the third register 143, instead of the second register 142. Then, the second register 142 stores a processing result of different data. That is, it is possible to avoid a state in which some kind of data and the processed data are stored in the same register temporally continuously (or at temporally adjacent clocks).

Thus, according to the present embodiment, when a comparison is made before and after processing of each step of encryption, it is possible to avoid an occurrence of correlation between a physical bit transition (or a Hamming distance) of the second register 142 and a bit transition (or a Hamming distance) of data itself to be encrypted. Therefore, even if there is a correlation between a physical bit transition (or a Hamming distance) of the second register 142 and changes in power consumption, it is possible to avoid an occurrence of correlation between a bit transition (or a Hamming distance) of data itself to be encrypted and changes in power consumption. Then, because there is no correlation between a bit transition (or a Hamming distance) of data itself to be encrypted and changes in power consumption, even if changes in power consumption are analyzed, forming an estimation of a bit transition (or a Hamming distance) of data itself to be encrypted can be avoided and based on the bit transition, estimating a secret key can also be avoided.

Figure 6:
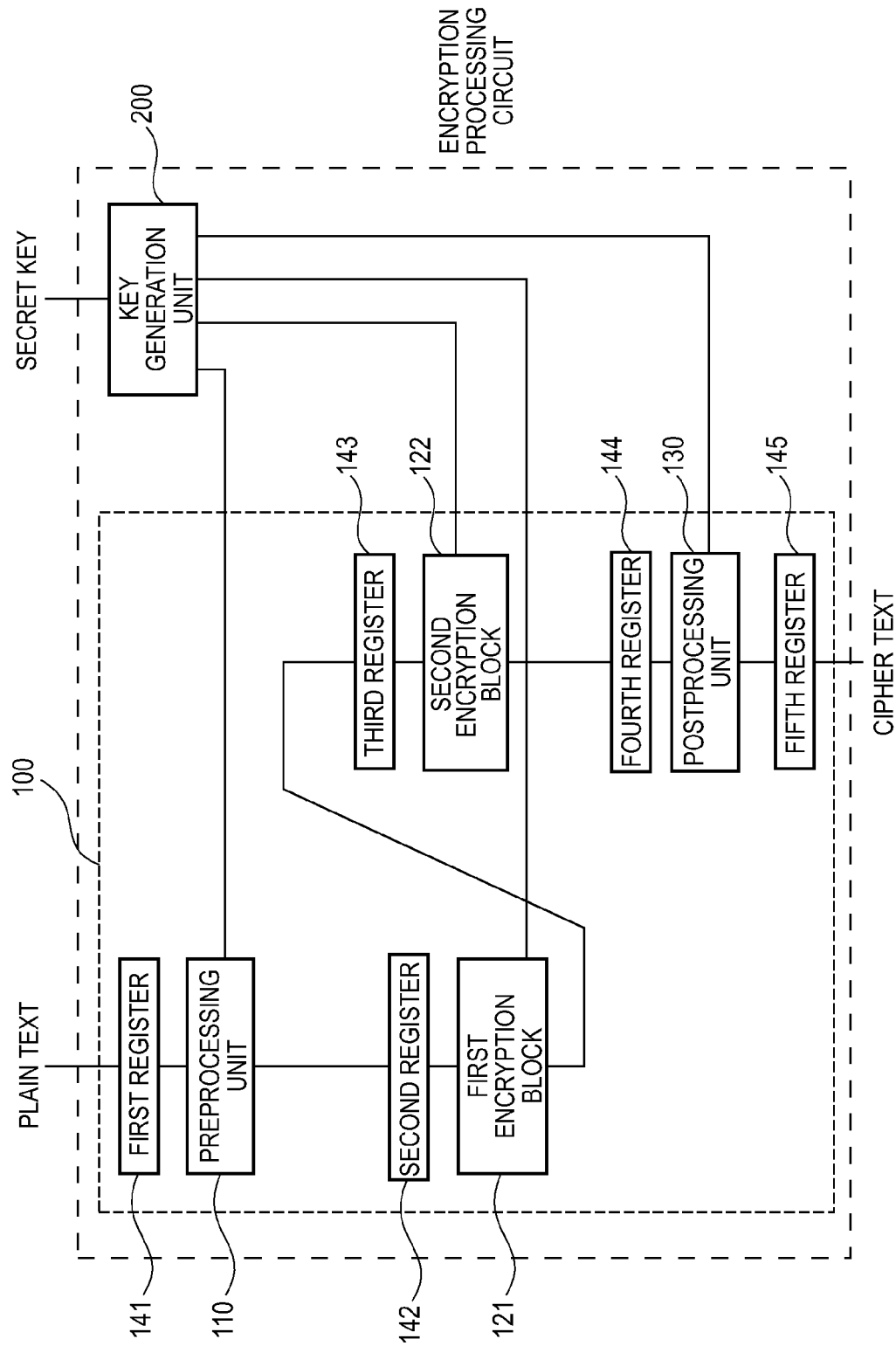
FIG. 6 A figure illustrates an outline block diagram of the encryption processing circuit that performs pipeline processing.
Figure 7:
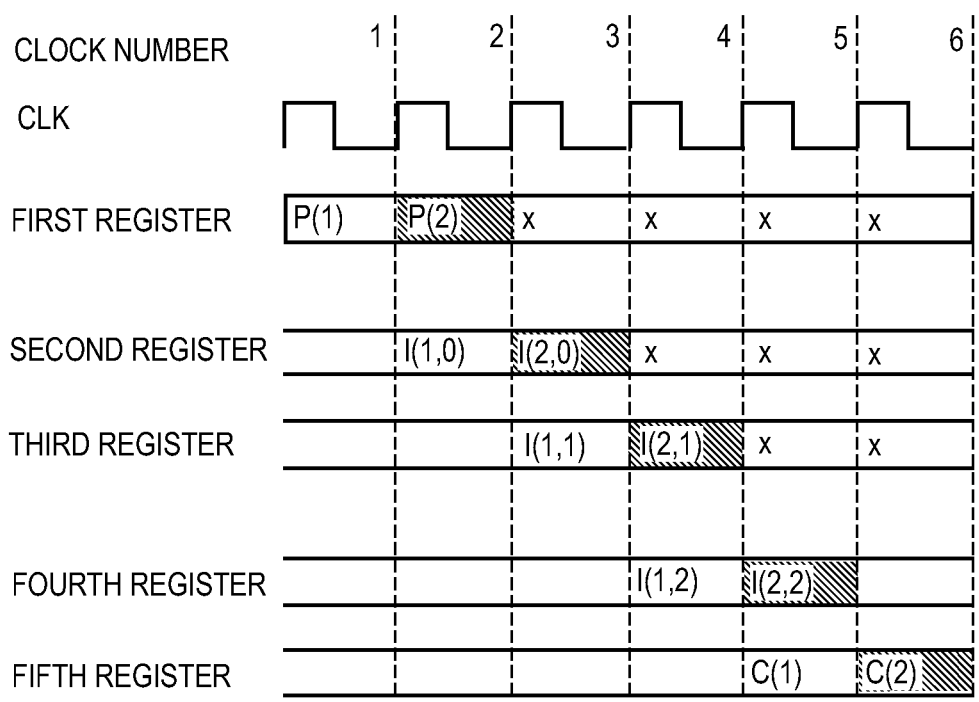
FIG. 7 A figure illustrates a timing chart of the encryption processing circuit that performs pipeline processing.

Even when pipeline processing is performed, the Hamming distance may be calculable so that the secret key can be analyzed. FIG. 6 illustrates an example of a 2-stage pipeline cryptographic circuit. The timing chart of the cryptographic circuit is as illustrated in FIG. 7. If, for example, the third register 143 is looked at, data I(2, 1) is next to data I(1, 1). If an inverse operation of the postprocessing and one step of encryption processing can be performed by using the estimated cryptographic key, the data I(1, 1) and data I(2, 1) can be calculated based on measured cipher text C(1) and cipher text C(2) respectively and therefore, the bit transition from the data I(1, 1) to the data I(2, 1) can be calculated. The bit transition is a physical bit transition of the third register 143 and also a bit transition of data itself to be encrypted. Then, there is a correlation between the bit transition and changes in power consumption of the third register 143. Therefore, by calculating a bit transition from the data I(1, 1) to the data I(2, 1) by using individual cryptographic keys among many estimated cryptographic keys, determining a correlation between the calculated bit transition and measured power consumption of the third register 143, and examining the use of which estimated cryptographic key results in a high correlation, which of estimated cryptographic keys is actually used can be known.

Also in the present embodiment, if processing is started by shifting only one step, processing results of the same step are continuously stored in the same register and thus, the same problem as that of pipeline processing arises. However, if processing is started by shifting two steps or more, processing results of the same step are not continuous in the same register, which makes analyses difficult.

Figure 8:
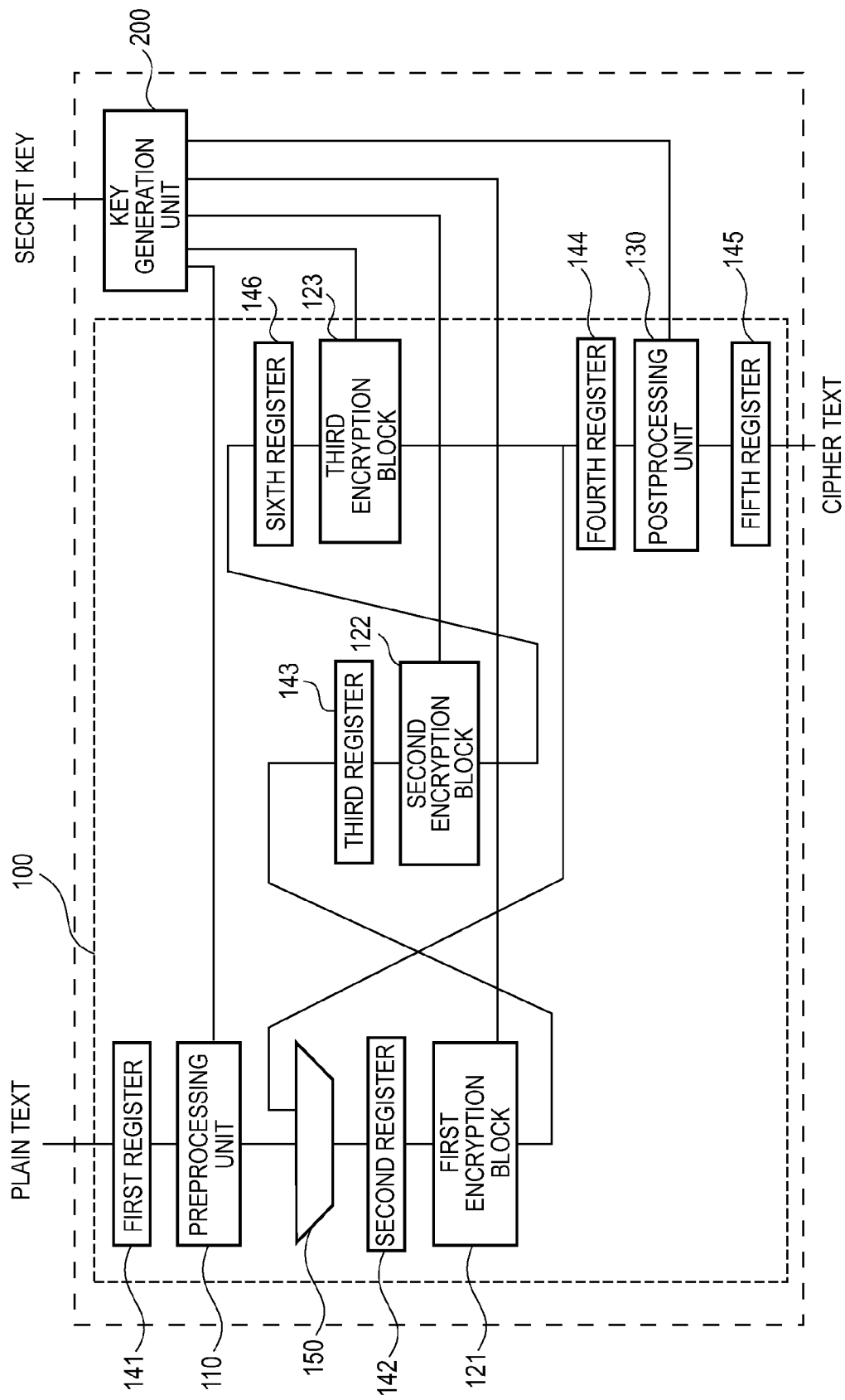
FIG. 8 A figure illustrates an outline block diagram (three encryption blocks are installed) of the encryption processing circuit according to the first embodiment of the present invention.

The embodiment in FIG. 1 illustrates a configuration using two encryption blocks, but as illustrated in FIG. 8, a configuration using three sets of the encryption block and register can also be considered. In that case, by changing in each step the encryption block and data storage register to be used in the processing flow of one piece of data, tamper resistance can be provided to the encryption processing circuit so that the performance/area ratio can be inhibited from decreasing. Moreover, by increasing the numbers of the third registers 143 and the second encryption blocks 122 to a plural number, in general, a configuration using N sets of the encryption block and register can be built.

Second Embodiment

Next, a second embodiment of the present invention will be described.

Figure 9:
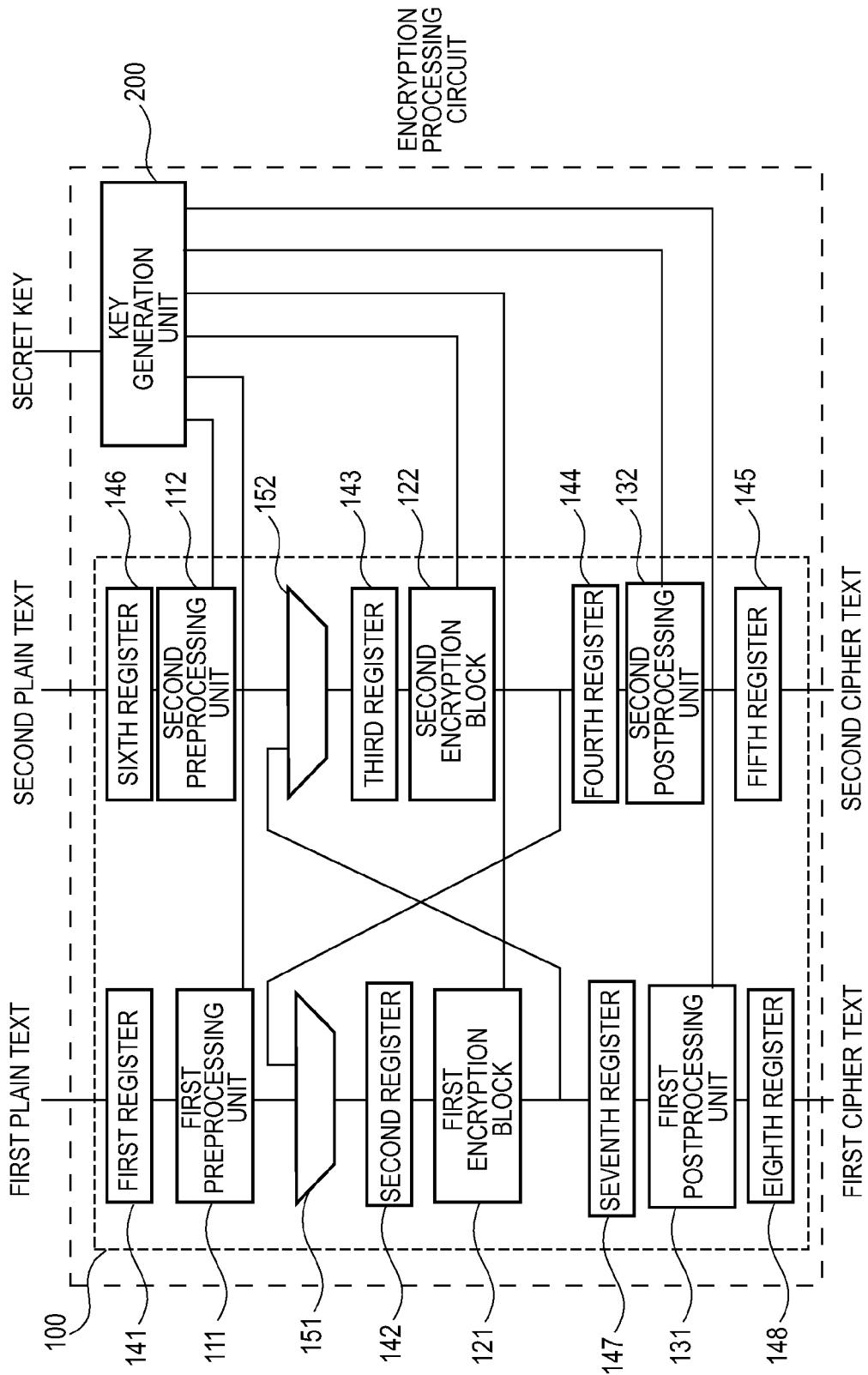
FIG. 9 A figure illustrates an outline block diagram of the encryption processing circuit according to a second embodiment of the present invention.

FIG. 9 illustrates a block diagram of the second embodiment. The second embodiment is different from the first embodiment in that input/output is enabled from a plurality of places. In addition, a plurality of preprocessing units and postprocessing units is provided to fit to each input/output. More specifically, a first preprocessing unit 111 and a second preprocessing unit 112 are provided as preprocessing units and a first postprocessing unit 131 and a second postprocessing unit 132 are provided as postprocessing units. Correspondingly, first to eighth registers 141 to 148 are provided as registers.

There is only one input/output unit in the first embodiment and at least one step needs to be shifted as the processing start timing of two pieces of plain text, but in the second embodiment, the processing can be started at the same time to perform parallel processing.

However, if two pieces of plain text and two secret keys used therefor are all the same, tamper resistance decreases. When the same data is processed, data being processed in the same step is all the same. Thus, the same result as writing data after encryption processing into the same register follows and a correlation arises between a bit transition of the register and power consumption so that the secret key can be analyzed.

Therefore, even if data is fetched from two places or a plurality of places and processed, it is desirable to shift at least two steps of the start timing of processing if the same secret key is used for processing. Even if, for example, data is fetched at the same time, a method of holding the data in one preprocessing unit for a fixed number of clocks before starting processing by the encryption block can also be considered.

Also, a method of outputting two pieces of cipher text at the same time can be considered by deferring the output of cipher text on the side of the postprocessing unit whose data arrives first until processing on the other side is completed.

In the second embodiment, the numbers of preprocessing units, postprocessing units, and registers increase and the circuit size is larger than in the first embodiment.

However, processing can be started at the same time and therefore, the time when the other encryption block is not operating at the start or end of the processing can be reduced so that throughput of encryption processing can be improved.

Third Embodiment

Next, a third embodiment of the present invention will be described.

Figure 10:
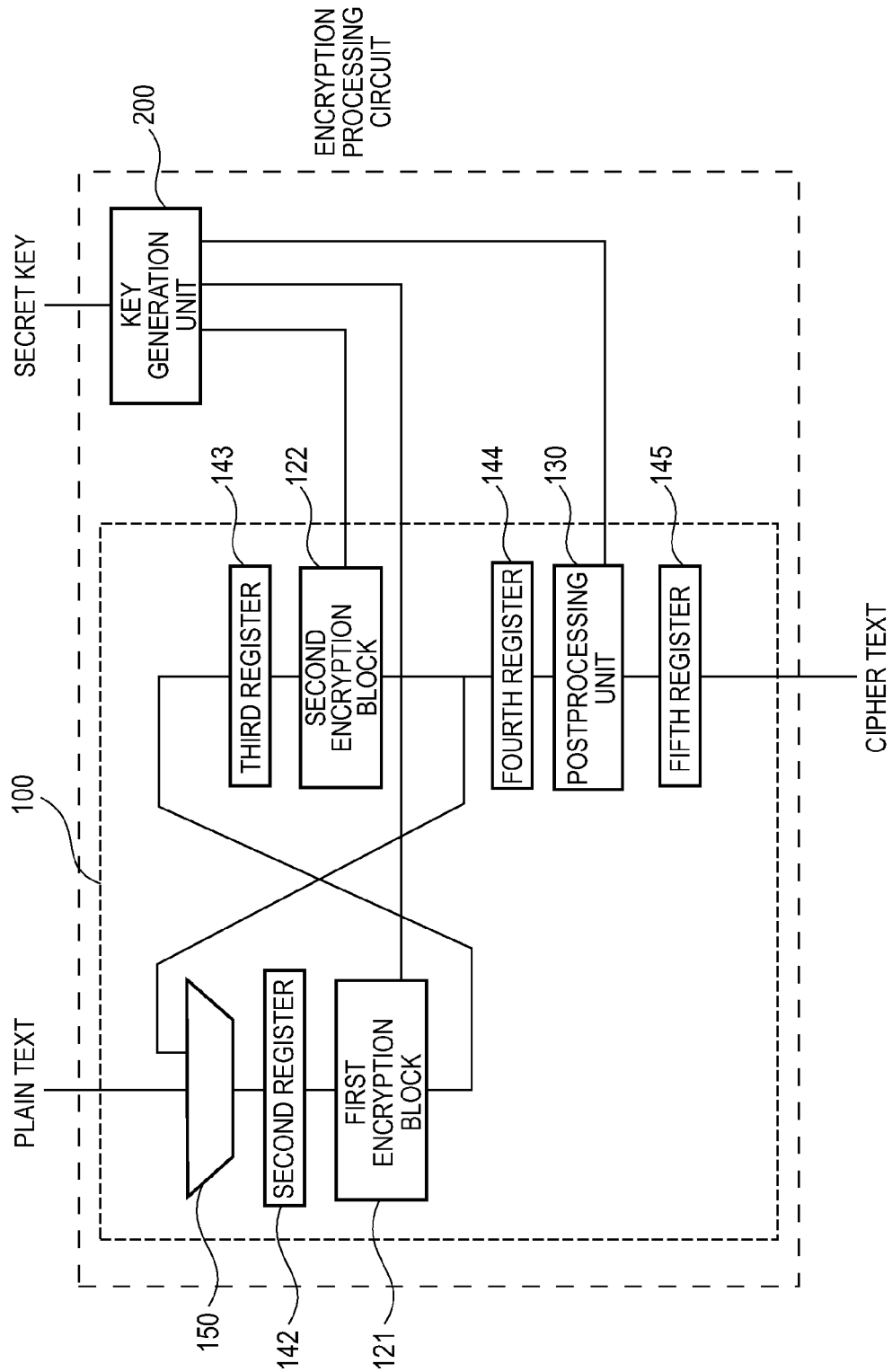
FIG. 10 A figure illustrates an outline block diagram (no preprocessing) of the encryption processing circuit according to a third embodiment of the present invention.
Figure 11:
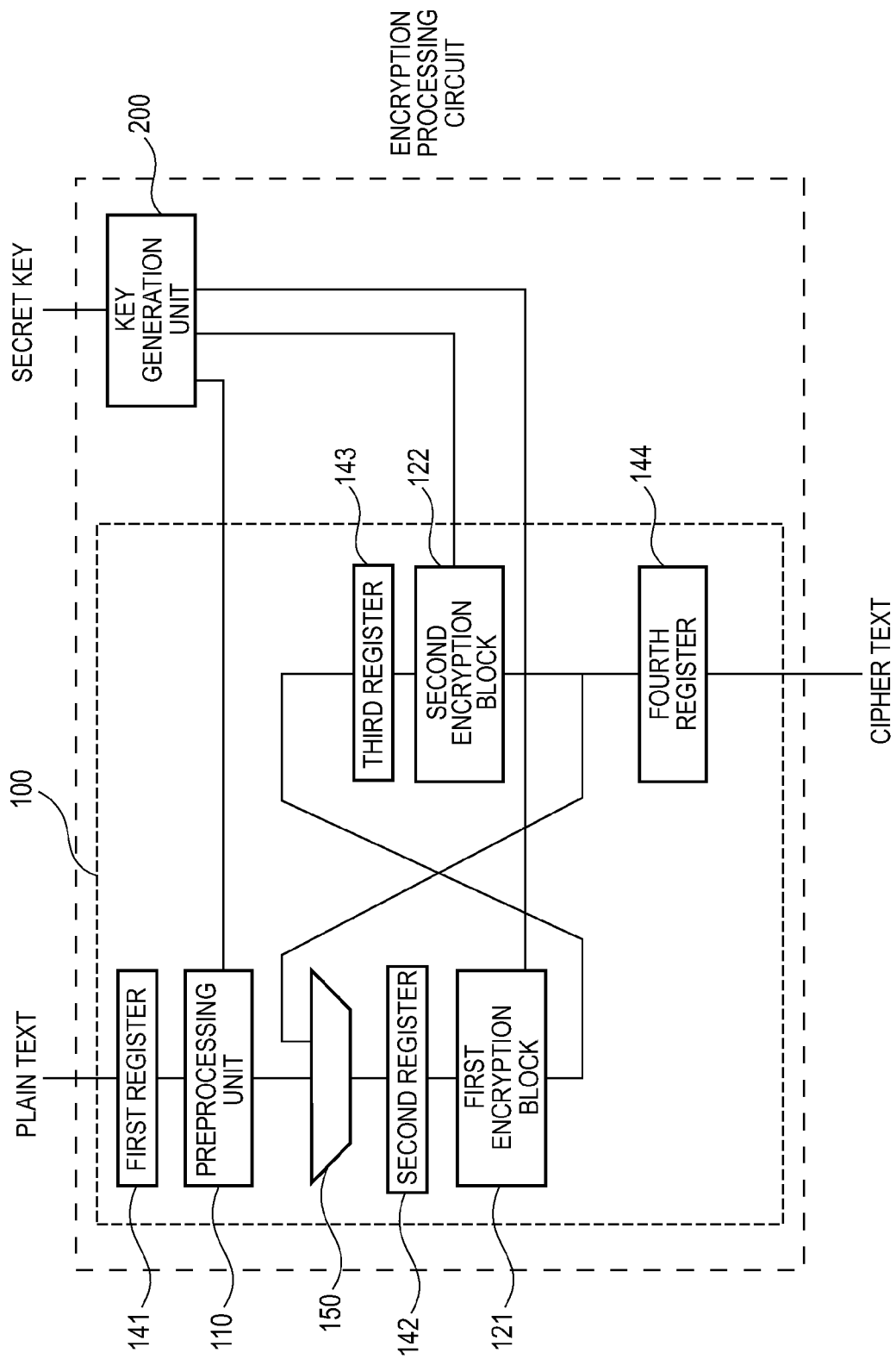
FIG. 11 A figure illustrates an outline block diagram (no postprocessing) of the encryption processing circuit according to the third embodiment of the present invention.
Figure 12:
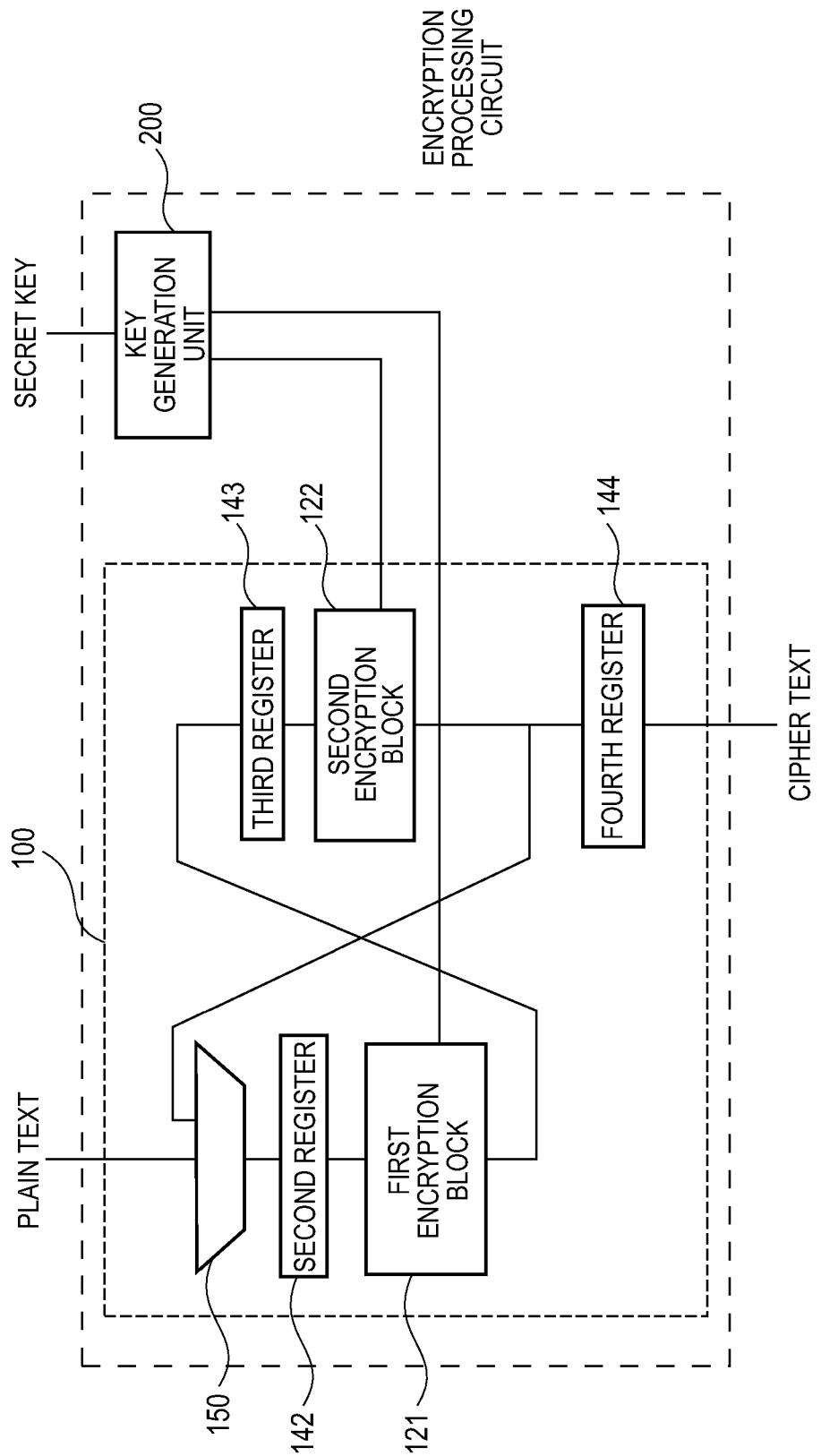
FIG. 12 A figure illustrates an outline block diagram (no preprocessing/no postprocessing) of the encryption processing circuit according to the third embodiment of the present invention.

FIGS. 10 to 12 illustrate block diagrams of the third embodiment. The third embodiment is different from the first embodiment in that one or both of the preprocessing unit and the postprocessing units are not included. FIG. 10 illustrates a configuration without preprocessing, FIG. 11 illustrates a configuration without postprocessing, and FIG. 12 illustrates a configuration without preprocessing/postprocessing.

Figure 13:
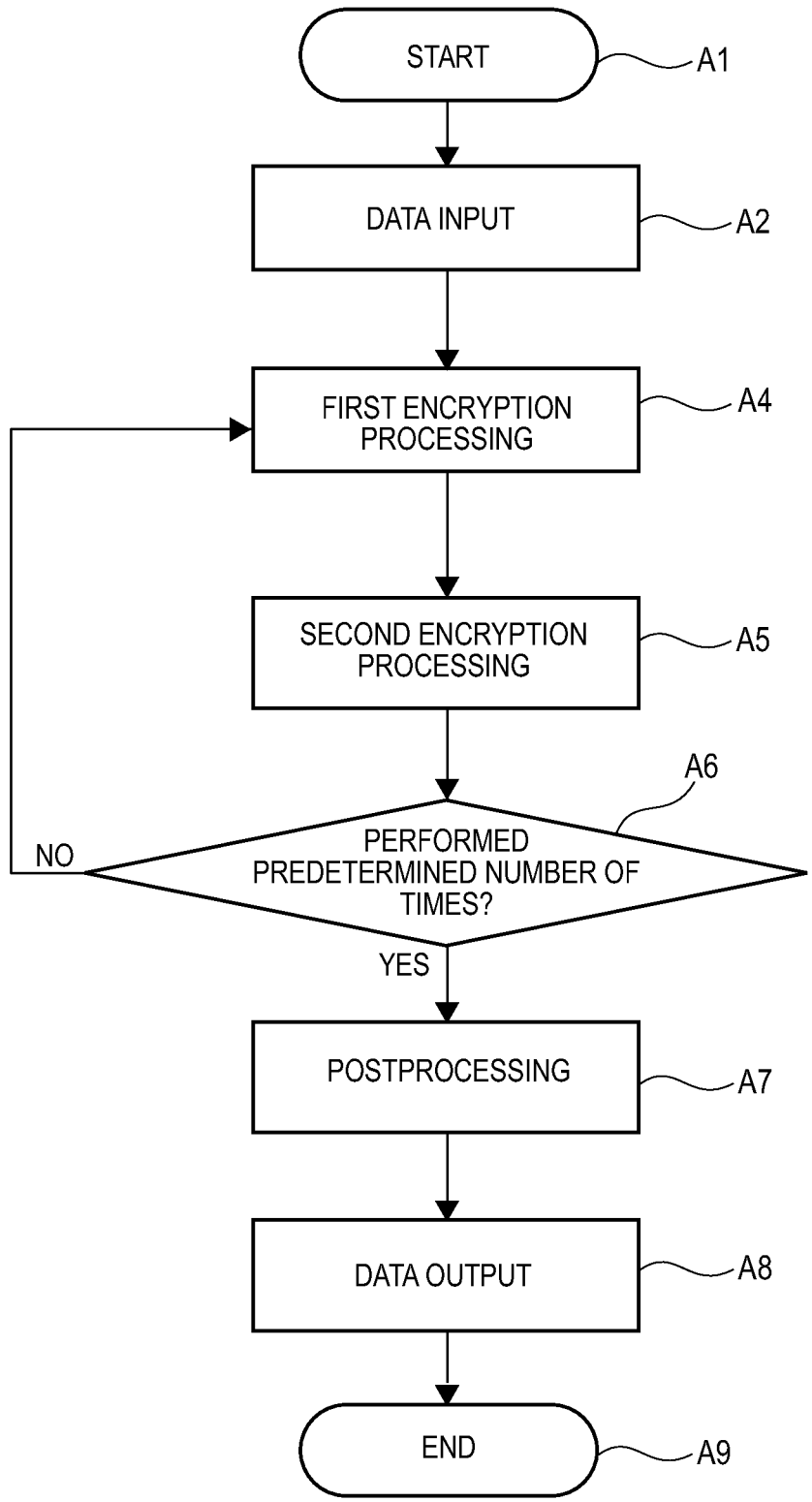
FIG. 13 A figure illustrates an operation flow (no preprocessing) of the encryption processing circuit according to the third embodiment of the present invention.
Figure 14:
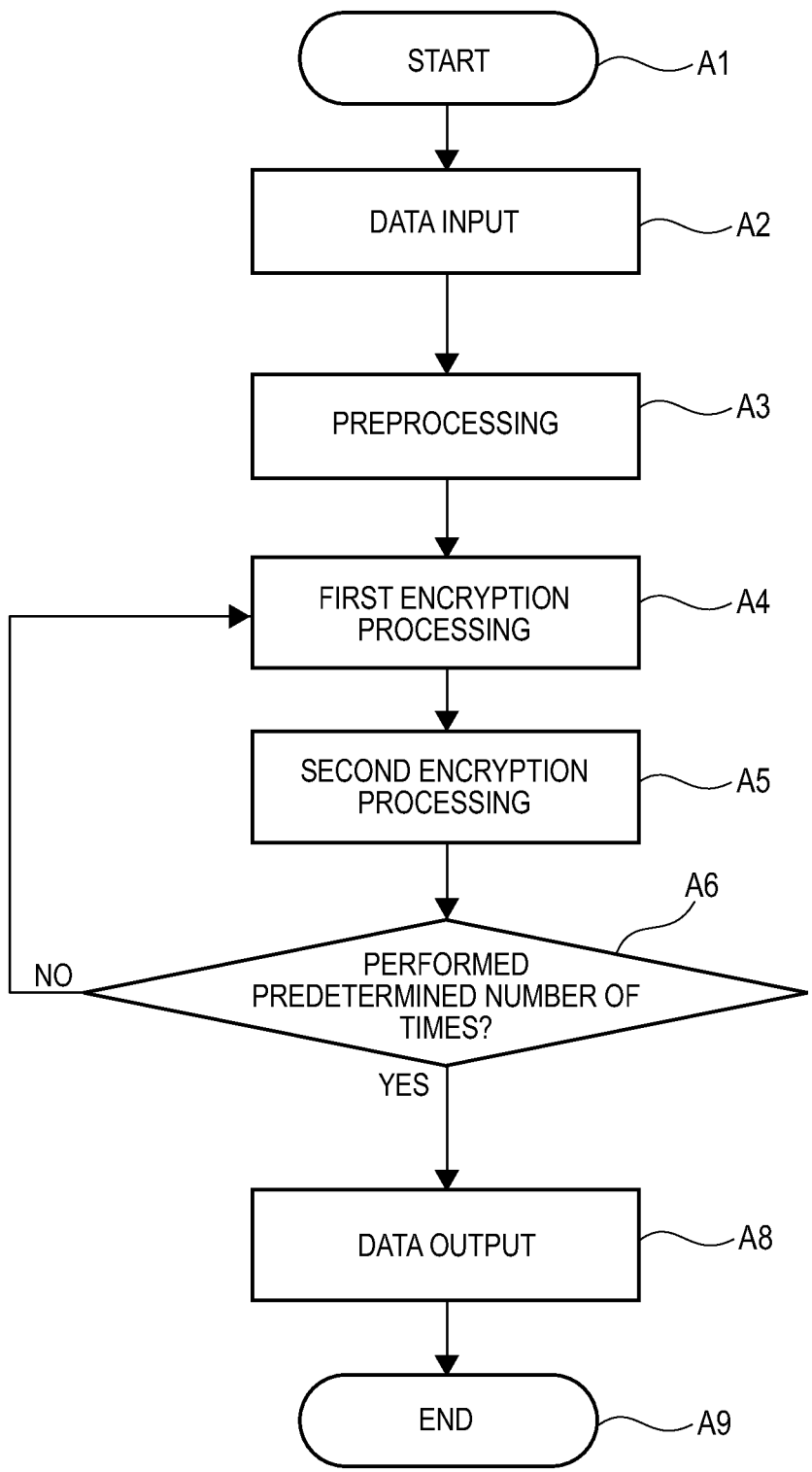
FIG. 14 A figure illustrates an operation flow (no postprocessing) of the encryption processing circuit according to the third embodiment of the present invention.
Figure 15:
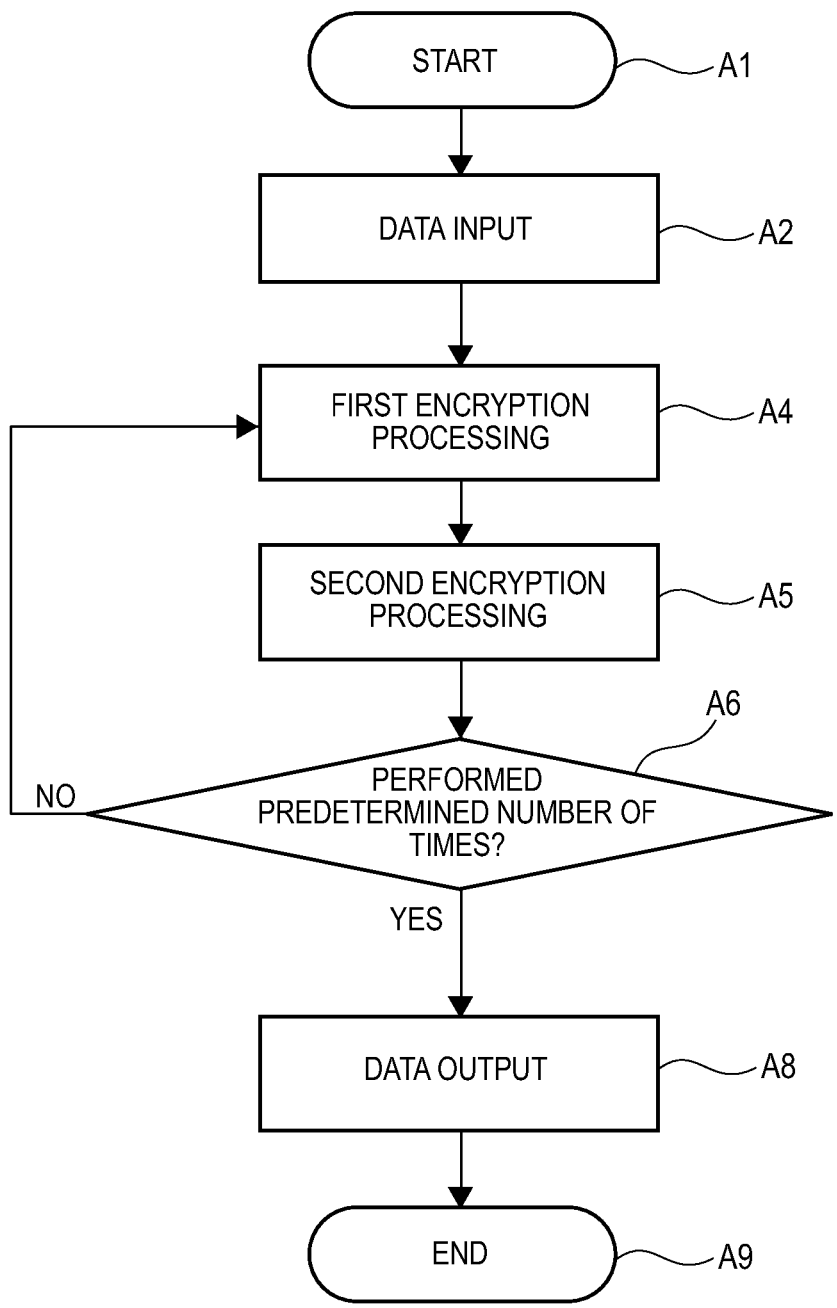
FIG. 15 A figure illustrates an operation flow (no preprocessing/no postprocessing) of the encryption processing circuit according to the third embodiment of the present invention.

Flow charts to describe the operation of the third embodiment are illustrated in FIGS. 13 to 15. FIG. 13 illustrates a flow chart to describe the operation of a configuration without preprocessing, FIG. 14 illustrates a flow chart to describe the operation of a configuration without postprocessing, and FIG. 15 illustrates a flow chart to describe the operation of a configuration without preprocessing/postprocessing. The flow charts of operations in these configurations are those obtained by removing preprocessing or postprocessing from the flow chart in the first embodiment illustrated in FIG. 2.

If preprocessing or postprocessing is not needed in encryption processing, the third embodiment can be applied. The third embodiment can also be applied when preprocessing or postprocessing is performed outside an encryption processing circuit.

The effect of the third embodiment is, like the effect of the first embodiment, to make it difficult to analyze the secret key from a correlation between power consumption and the Hamming distance when the performance/area ratio is roughly equivalent to that of sequential processing.

According to the above embodiments, as described above, update values of data are written into different registers by using an encryption processing circuit, which makes side channel attacks using the bit transition of a register difficult. In addition, while the circuit size increases with improved resistance, the performance/area ratio can be inhibited from decreasing by causing a vacant encryption block to process other data.

Example 1

The configuration of an encryption processing circuit when 128-bit AES is used as a cipher. An example in which an encryption circuit of AES is implemented by using the third embodiment (without postprocessing) of the present invention is shown.

Figure 16:
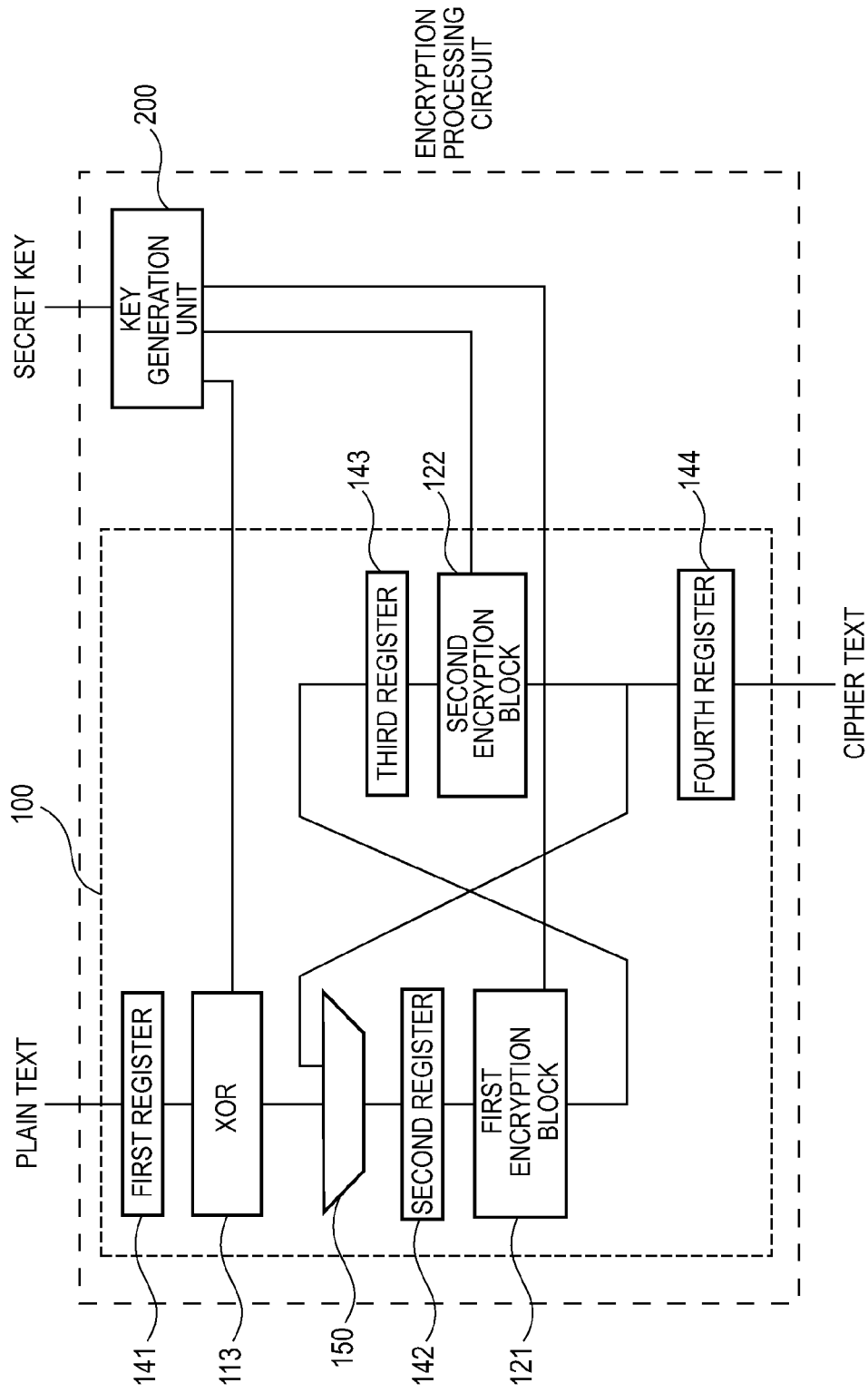
FIG. 16 A figure illustrates an outline block diagram of an AES encryption processing circuit in Example 1.

FIG. 16 illustrates the configuration of the circuit.

An exclusive OR circuit (XOR) 113 as a preprocessing unit performs an exclusive OR operation of plain text and a secret key as preprocessing of AES.

The first encryption block 121 and the second encryption block 122 each perform processing of one stage of round processing of AES and a sequence of processing of SubByte, ShiftRow, MixColumn, and AddRoundKey is set as a step of processing. Incidentally, MixColumn processing in the tenth round is skipped.

In Example 1, the interval between the start of processing of one piece of plain text and the start of processing of the next plain text is five clocks.

The key generation unit 200 outputs a secret key and a round key generated from the secret key to the exclusive OR circuit (XOR) 113 as a preprocessing unit and the first encryption block 121 and the second encryption block 122 that perform round processing.

Figure 17:
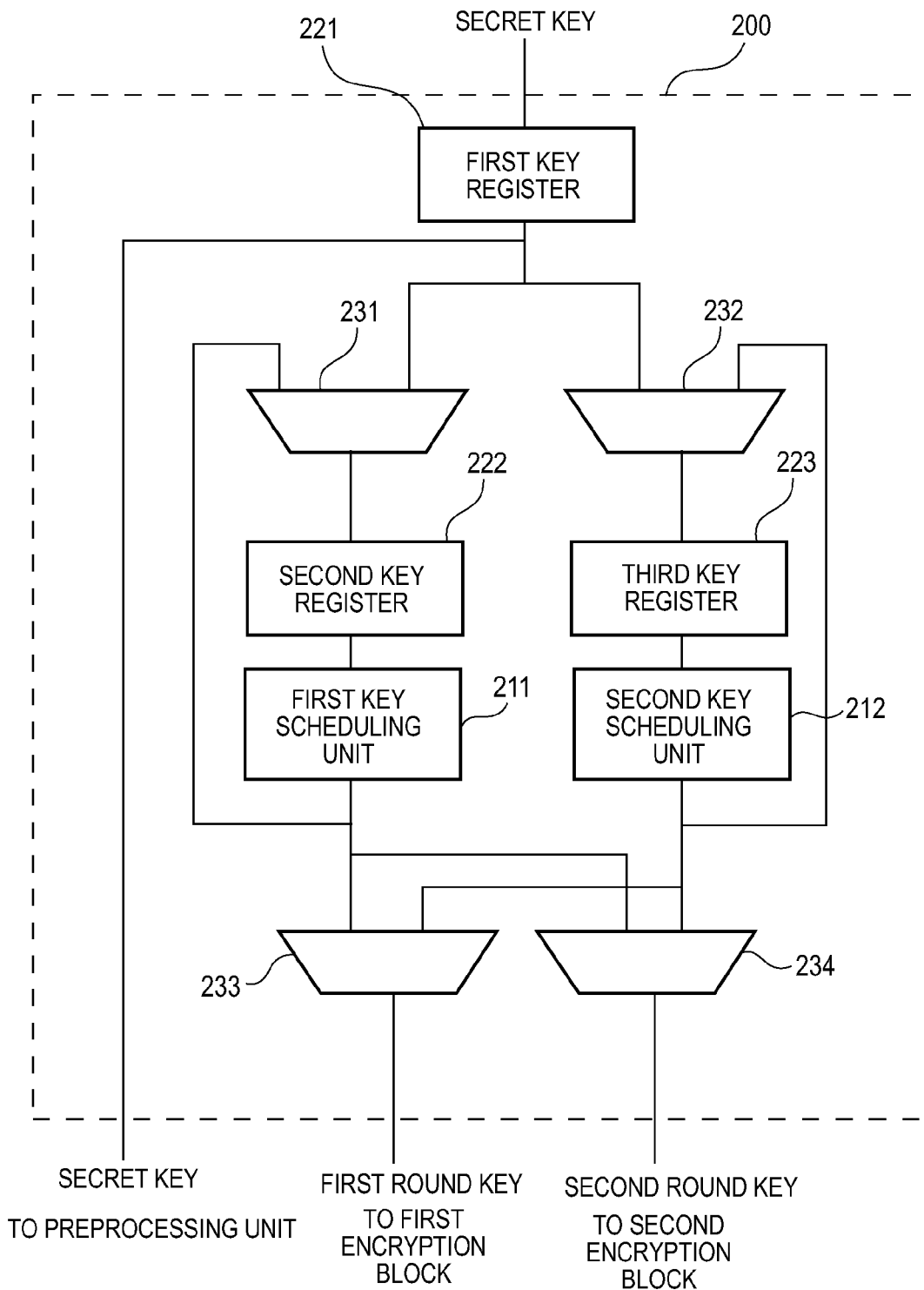
FIG. 17 A figure illustrates an outline block diagram of a key generation unit in Example 1.

FIG. 17 illustrates a configuration example of the key generation unit. The key generation unit 200 includes first and second key scheduling units 211, 212, first to third key registers 221 to 223 that store a secret key and a round key, and four selectors 231 to 234.

When a secret key is input, the first key register 221 first stores the secret key.

In the next step, the secret key is output to the exclusive OR circuit (XOR) 113 so that the exclusive OR circuit (XOR) 113 as a preprocessing unit can perform an exclusive OR operation with plain text in the preprocessing stage and also the secret key is sent to one of the first key scheduling unit 211 and the second key scheduling unit 212 and the second key register 222 or the third key register 223 stores the sent secret key.

Next, the first key scheduling unit 211 or the second key scheduling unit 212 generates a round key and outputs the round key to one of the first encryption block 121 and the second encryption block 122. At the same time, the second key register 222 or the third key register 223 stores the round key.

If the secret key for the next data is input in the meantime, the secret key is sent to the first key scheduling unit 211 or the second key scheduling unit 212 that is a vacant key scheduling unit and the key scheduling unit also creates a round key repeatedly.

When the generation of the round key in the final stage is completed, the next secret key is input by the selector 231 or 232 to repeat the generation of a round key again.

The selector 233 and the selector 234 make a selection of a round key of which of the first key scheduling unit 211 and the second key scheduling unit 212 to output to the first encryption block 121 or the second encryption block 122.

When keys to be used are common to all plain text, a configuration in which round keys are generated in advance and stored in a memory and the key fitting to an exclusive OR operation or the round to be processed is output as the preprocessing unit is also possible.

Figure 18:
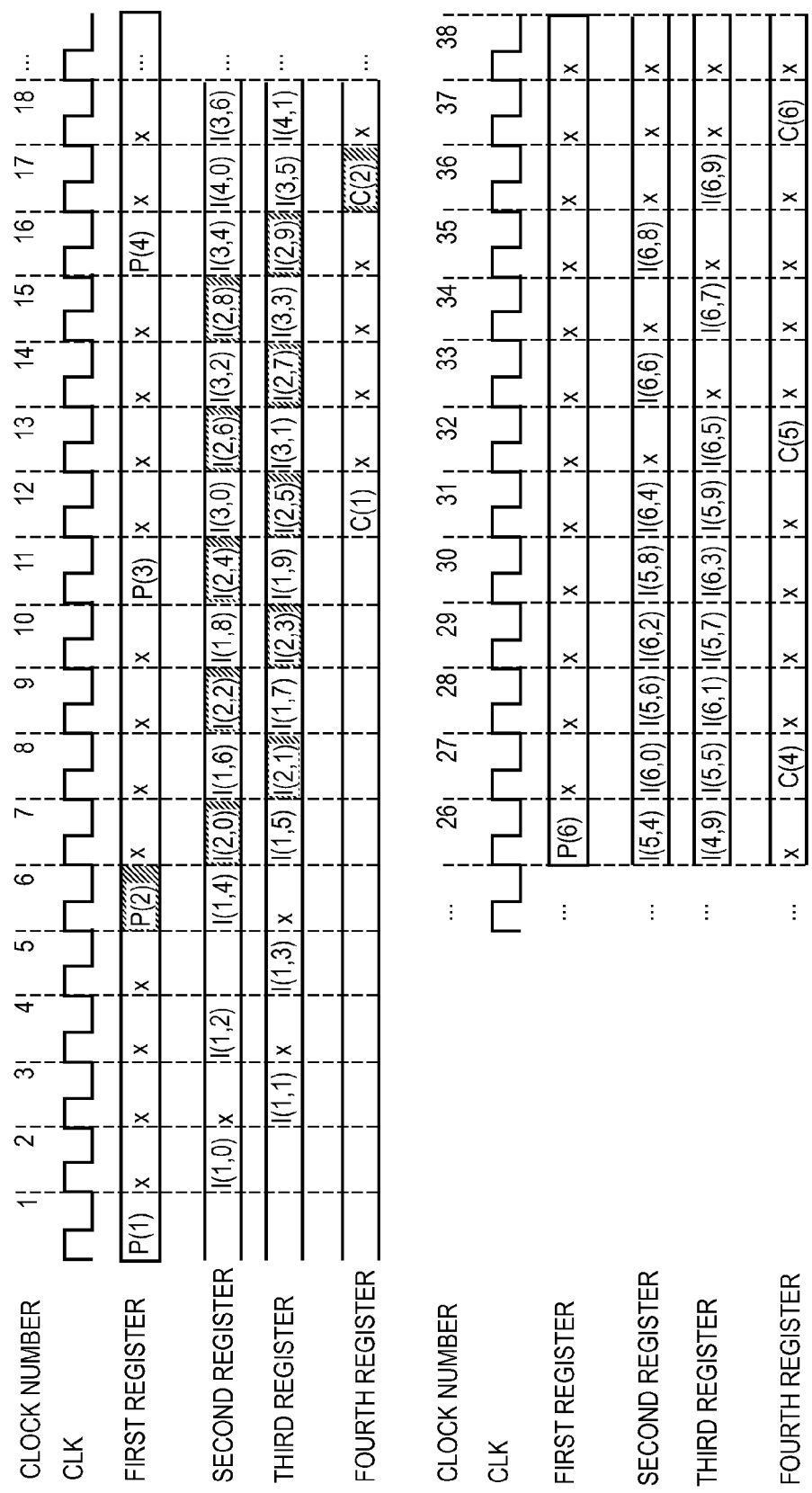
FIG. 18 A figure illustrates a timing chart of a 128-bit AES encryption processing circuit in Example 1.

The operation in Example 1 will be described by using the timing chart in FIG. 18.

In Example 1, six pieces of plain text are encrypted by AES.

To describe symbols in the timing chart, P(i) is i-th plain text data, I(i, 0) is data obtained after performing XOR of i-th plain text and a secret key, I(i, k) is data obtained after the k-th step of round processing on i-th plain text, and C(i) is cipher text corresponding to i-th plain text after preprocessing and ten rounds of round processing. x is undefined data.

At clock CLK1, the first plain text P(1) is input into the encryption processing circuit and the first register 141 stores plain text P(1).

At clock CLK2, the exclusive OR circuit 113 performs an exclusive OR operation of the plain text P(1) and a secret key. The second register 142 stores data I(1, 0).

At clock CLK3, the first encryption block 121 performs the first round of encryption processing on the data I(1, 0). The third register 143 stores data I(1, 1).

At clock CLK4, the second encryption block 122 performs the second round of the encryption processing on the data I(1, 1). The second register 142 stores data I(1, 2).

At clock CLK5, the first encryption block 121 performs the third round of the encryption processing on the data I(1, 2). The third register 143 stores data I(1, 3).

At clock CLK6, the second encryption block 122 performs the fourth round of the encryption processing on the data I(1, 3). The second register 142 stores data I(1, 4).

Also at clock CLK6, the second plain text P(2) is input into the encryption processing circuit and the first register 141 stores plain text P(2).

At clock CLK7, the first encryption block 121 performs the fifth round of the encryption processing on the data I(1, 4). The third register 143 stores data I(1, 5).

Also at clock CLK7, the exclusive OR circuit 113 performs an exclusive OR operation of the plain text P(2) and the secret key. The second register 142 stores data I(2, 0).

At clock CLK8, the second encryption block 122 performs the sixth round of the encryption processing on the data I(1, 5). The second register 142 stores data I(1, 6).

At clock CLK8, the first encryption block 121 performs the first round of processing on the data I(2, 0). The third register 143 stores data I(2, 1).

At clock CLK9, the first encryption block 121 performs the seventh round of the encryption processing on the data I(1, 6). The third register 143 stores data I(1, 7).

Also at clock CLK9, the second encryption block 122 performs the second round of the processing on the data I(2, 1). The second register 142 stores data I(2, 2).

At clock CLK10, the second encryption block 122 performs the eighth round of the encryption processing on the data I(1, 7). The second register 142 stores data I(1, 8).

Also at clock CLK10, the first encryption block 121 performs the third round of the processing on the data I(2, 2). The third register 143 stores data I(2, 3).

At clock CLK11, the first encryption block 121 performs the ninth round of the encryption processing on the data I(1, 8). The third register 143 stores data I(1, 9).

Also at clock CLK11, the second encryption block 122 performs the fourth round of the processing on the data I(2, 3). The second register 142 stores data I(2, 4).

Further at clock CLK11, the third plain text P(3) is input into the encryption processing circuit. The first register 141 stores the plain text P(3).

At clock CLK12, the second encryption block 122 performs the tenth round of the encryption processing on the data I(1, 9). The fourth register 144 stores cipher text C(1).

Also at clock CLK12, the first encryption block 121 performs the fifth round of the processing on the data I(2, 4). The third register 143 stores data I(2, 5).

Further at clock CLK12, the exclusive OR circuit 113 performs an exclusive OR operation of the plain text P(3) and the secret key. The second register 142 stores data I(3, 0) as a result of the exclusive OR operation.

At clock CLK13, the cipher text C(1) as an encryption result on the plain text P(1) is output.

Also at clock CLK13, the second encryption block 122 performs the sixth round of the encryption processing on the data I(2, 5). The second register 142 stores data I(2, 6).

Further at clock CLK13, the first encryption block 121 performs the first round of the encryption processing on the data I(3, 0). The third register 143 stores data I(3, 1).

At clock CLK14, the first encryption block 121 performs the seventh round of the encryption processing on the data I(2, 6). The third register 143 stores data I(2, 7).

Also at clock CLK14, the second encryption block 122 performs the second round of the encryption processing on the data I(3, 1). The second register 142 stores data I(3, 2).

At clock CLK15, the second encryption block 122 performs the eighth round of the encryption processing on the data I(2, 7). The second register 142 stores data I(2, 8).

At clock CLK15, the first encryption block 121 performs the third round of the encryption processing on the data I(3, 2). The third register 143 stores data I(3, 3).

At clock CLK16, the first encryption block 121 performs the ninth round of the encryption processing on the data I(2, 8). The third register 143 stores data I(2, 9).

At clock CLK16, the second encryption block 122 performs the fourth round of the encryption processing on the data I(3, 3). The second register 142 stores data I(3, 4).

Further at clock CLK16, the fourth plain text P(4) is input into the encryption processing circuit. The first register 141 stores the plain text P(4).

At clock CLK17, the second encryption block 122 performs the tenth round of the encryption processing on the data I(2, 9). The fourth register 144 stores cipher text C(2).

Also at clock CLK17, the first encryption block 121 performs the fifth round of the encryption processing on the data I(3, 4). The third register 143 stores data I(3, 5).

Further at clock CLK17, the exclusive OR circuit 113 performs an exclusive OR operation of the plain text P(4) and the secret key. The second register 142 stores data I(4, 0).

At clock CLK18, the cipher text C(2) as an encryption result on the plain text P(2) is output.

Also at clock CLK18, the second encryption block 122 performs the sixth round of the encryption processing on the data I(3, 5). The second register 142 stores data I(3, 6).

Further at clock CLK18, the first encryption block 121 performs the first round of the encryption processing on the data I(4, 0). The third register 143 stores data I(4, 1).

At clocks CLK19 to 25, input, an exclusive OR operation, round processing, and output are successively performed.

At clock CLK26, the first encryption block 121 performs the ninth round of the encryption processing on data I(4, 8). The third register 143 stores data I(4, 9).

At clock CLK26, the second encryption block 122 performs the fourth round of the encryption processing on data I(5, 3). The second register 142 stores data I(5, 4).

Further at clock CLK26, the sixth plain text P(6) is input into the encryption processing circuit. The first register 141 stores the plain text P(6).

At clock CLK27, the second encryption block 122 performs the tenth round of the encryption processing on the data I(4, 9). The fourth register 144 stores cipher text C(4).

Also at clock CLK27, the first encryption block 121 performs the fourth round of the encryption processing on the data I(5, 4). The third register 143 stores data I(5, 4).

Further at clock CLK27, the exclusive OR circuit 113 performs an exclusive OR operation of the plain text P(6) and the secret key. The second register 142 stores data I(6, 0) as a result of the exclusive OR operation.

At clock CLK28, the cipher text C(4) as an encryption result on the plain text P(4) is output.

Also at clock CLK28, the second encryption block 122 performs the sixth round of the encryption processing on the data I(5, 5). The second register 142 stores data I(5, 6).

Further at clock CLK28, the first encryption block 121 performs the first round of the encryption processing on the data I(6, 0). The third register 143 stores data I(6, 1).

At clock CLK29, the first encryption block 121 performs the seventh round of the encryption processing on the data I(5, 6). The third register 143 stores data I(5, 7).

Also at clock CLK29, the second encryption block 122 performs the second round of the encryption processing on the data I(6, 1). The second register 142 stores data I(6, 2).

At clock CLK30, the second encryption block 122 performs the eighth round of the encryption processing on the data I(5, 7). The second register 142 stores data I(5, 8).

Also at clock CLK30, the first encryption block 121 performs the third round of the encryption processing on the data I(6, 2). The third register 143 stores data I(6, 3).

At clock CLK31, the first encryption block 121 performs the ninth round of the encryption processing on the data I(5, 8). The third register 143 stores data I(5, 9).

Also at clock CLK31, the second encryption block 122 performs the fourth round of the encryption processing on the data I(6, 3). The second register 142 stores data I(6, 4).

At clock CLK32, the second encryption block 122 performs the tenth round of the encryption processing on the data I(5, 9). The fourth register 144 stores cipher text C(5).

Also at clock CLK32, the first encryption block 121 performs the fifth round of the encryption processing on the data I(6, 4). The third register 143 stores data I(6, 5).

At clock CLK33, the cipher text C(5) as an encryption result on the plain text P(5) is output.

Also at clock CLK33, the second encryption block 122 performs the sixth round of the encryption processing on the data I(6, 5). The second register 142 stores data I(6, 6).

At clock CLK34, the first encryption block 121 performs the seventh round of the encryption processing on the data I(6, 6). The third register 143 stores data I(6, 7).

At clock CLK35, the second encryption block 122 performs the eighth round of the encryption processing on the data I(6, 7). The second register 142 stores data I(6, 8).

At clock CLK36, the first encryption block 121 performs the ninth round of the encryption processing on the data I(6, 8). The third register 143 stores data I(6, 9).

At clock CLK37, the second encryption block 122 performs the tenth round of the encryption processing on the data I(6, 9). The fourth register 144 stores cipher text C(6).

At clock CLK38, the cipher text C(6) as an encryption result on the plain text P(6) is output.

In Example 1, the encryption processing circuit operates in a total of 13 clocks, 1 clock for input, 1 clock for preprocessing, 10 clocks for round processing, and 1 clock for output.

In Example 1, no correlation arises between a bit transition of a register and a bit transition of data itself to be encrypted. Thus, there is no correlation between power consumption and a bit transition of data itself to be encrypted and it is difficult to estimate the secret key by analyzing the power consumption.

In Example 1, the time interval between the start of processing of one piece of plain text and the start of processing of the next plain text is set to 5 clocks.

In consideration of performing processing by using two encryption blocks, intervals of odd clocks like 1, 3, 5, 7, and 9 can be considered as time intervals thereof. In the case of, among others, 1 clock and 9 clocks, the calculation of the Hamming distance is easy, leading to lower tamper resistance. That is, in the case of 1 clock, the transition of data written into a register is equivalent to pipelining in two stages in FIG. 7. In the case of 9 clocks, data I(2, 1) comes after data I(1, 9) and the data I(1, 9) can be calculated if an inverse operation of one round can be performed from cipher text and the data I(2, 1) can be calculated by performing an operation of one round from plain text. Thus, if the time interval is a time interval for 1 clock (1 round) or a time interval for 9 clocks (9 rounds), tamper resistance compares unfavorably with the other cases of 3, 5, or 7 rounds.

Therefore, when the present invention is applied to 128-bit AES, it is better to shift at least two rounds as the operation interval and in Example 1, it is desirable to set 3, 5, or 7 clocks as the operation interval. That is, it is desirable to select 3, 5, or 7 as numbers equal to 2 or greater and equal to the number of processing of rounds (=10)-2=8 or less from 1, 3, 5, 7, and 9 and set these numbers as the operation interval.

In the above embodiments and the example, only the encryption processing circuit has been described, but a decryption processing circuit (that is, a cryptanalysis processing circuit) can similarly be configured like the encryption processing circuit by applying the present invention. In this case, "encryption" is replaced by "decryption". For example, an "encryption block" is replaced by a "decryption block". Incidentally, decryption processing is processing to bring cipher text back to plain text.

Incidentally, the above encryption processing circuit can be realized by hardware, software, or a combination of hardware and software. In addition, the encryption processing method executed by the above encryption processing circuit or other apparatuses can also be realized by hardware, software, or a combination of hardware and software. Being realized by software means being realized by a program being read by a computer and executed. Here, for example, first to n-th registers 141 to 14N are registers contained in a CPU or entries of a memory such as a main memory and cache memory.

A program is stored by using various types of non-transitory computer readable media so that the program be supplied to the computer. The non-transitory computer readable media include various types of tangible storage media. Examples of the non-transitory computer readable media include a magnetic recording medium (for example, a flexible disk, magnetic tape, or hard disk drive), a magneto-optical recording medium (for example, a magneto-optical disk), CD-ROM (Read Only Memory), CD-R, CD-R/W, and a semiconductor memory (for example, a mask ROM, PROM (Programmable ROM), EPROM (Erasable PROM), flash ROM, or RAM (random access memory)). The program may also be supplied to a computer by various types of transitory computer readable media. Examples of the transitory computer readable media include an electric signal, an optical signal, and an electromagnetic wave. The transitory computer readable media can supply a program to a computer via a wire communication channel such as an electric wire, optical fiber or the like or a wireless communication channel.

This application is based upon Japanese Patent Application No. 2011-258991 (filed on Nov. 28, 2011) and claims the benefit of priority under the Paris Convention from Japanese Patent Application No. 2011-258991. The entire contents of Japanese Patent Application No. 2011-258991 are incorporated herein by referring to Japanese Patent Application No. 2011-258991.

Typical embodiments of the present invention have been described in detail, but it should be understood that various changes, substitutions, and alternatives may be made without departing from the spirit and scope of the invention defined in claims. Even if claims should be amended in the application procedure, the inventors intend to maintain the equivalent scope of the claimed invention.

Part or the entirety of the above embodiments can be described as in the following notes, but is by no means limited to the following notes.

(Note 1)

An encryption processing circuit that encrypts plain text in a plurality of steps by using a cryptographic key, including N (N is an integer equal to 2 or greater) sets, each of which including an encryption block and a register, wherein
the encryption block of an i-th (i=1 to N−1) set performs encryption in a certain step on plain text stored in the register of the i-th set or intermediate data stored in the register of the i-th set obtained from the plain text and the intermediate data obtained by the encryption is stored in the register of an (i+1)-th set and
the encryption block of an N-th set performs the encryption in the certain step on plain text stored in the register of the N-th set or intermediate data stored in the register of the N-th set obtained from the plain text and the intermediate data obtained by the encryption is stored in the register of a first set.

(Note 2)

The encryption processing circuit according to Note 1, wherein
the encryption on a plurality of pieces of plain text is performed simultaneously by the encryption processing circuit in at least a portion of time and
when the encryption in the certain step on certain plain text stored in the register of a certain set or intermediate data stored in the register of the certain set obtained from the certain plain text is performed in the encryption block of the certain set at a certain clock, the encryption in another step on other plain text stored in the register of the certain set or intermediate data stored in the register of the certain set obtained from the other plain text is performed in the encryption block of the certain set at the next clock of the certain clock.

(Note 3)

The encryption processing circuit according to Note 2, further including: a timing adjustment unit that adjusts a start time of the encryption of the other plain text so as to be shifted by a predetermined number of clocks at least with respect to the start time of the encryption of the certain plain text, wherein
when the encryption in the certain step on the certain plain text stored in the register of the certain set or intermediate data stored in the register of the certain set obtained from the certain plain text is performed in the encryption block of the certain set at the certain clock by adjustments of the timing adjustment unit, the encryption in the other step on the other plain text stored in the register of the certain set or intermediate data stored in the register of the certain set obtained from the other plain text is performed in the encryption block of the certain set at the next clock of the certain clock.

(Note 4)

A decryption processing circuit that decrypts cipher text in a plurality of steps by using a cryptographic key, including N (N is an integer equal to 2 or greater) sets, each of which including a decryption block and a register, wherein
the decryption block of an i-th (i=1 to N−1) set performs decryption in a certain step on cipher text stored in the register of the i-th set or intermediate data stored in the register of the i-th set obtained from the cipher text and the intermediate data obtained by the decryption is stored in the register of an (i+1)-th set and
the decryption block of an N-th set performs the decryption in the certain step on cipher text stored in the register of the N-th set or intermediate data stored in the register of the N-th set obtained from the cipher text and the intermediate data obtained by the decryption is stored in the register of a first set.

(Note 5)

The decryption processing circuit according to Note 4, wherein
the decryption on a plurality of pieces of cipher text is performed simultaneously by the decryption processing circuit in at least a portion of time and
when the decryption in the certain step on certain cipher text stored in the register of a certain set or intermediate data stored in the register of the certain set obtained from the certain cipher text is performed in the decryption block of the certain set at a certain clock, the decryption in another step on other cipher text stored in the register of the certain set or intermediate data stored in the register of the certain set obtained from the other cipher text is performed in the decryption block of the certain set at the next clock of the certain clock.

(Note 6)

The decryption processing circuit according to Note 5, further including a timing adjustment unit that adjusts a start time of the decryption of the other cipher text so as to be shifted by a predetermined number of clocks at least with respect to the start time of the decryption of the certain cipher text, wherein
when the decryption in the certain step on the certain cipher text stored in the register of the certain set or intermediate data stored in the register of the certain set obtained from the certain cipher text is performed in the decryption block of the certain set at the certain clock by adjustments of the timing adjustment unit, the decryption in the other step on the other cipher text stored in the register of the certain set or intermediate data stored in the register of the certain set obtained from the other cipher text is performed in the decryption block of the certain set at the next clock of the certain clock.

(Note 7)

An encryption processing method of encrypting plain text in a plurality of steps by using a cryptographic key, wherein N (N is an integer equal to 2 or greater) sets, each of which including an encryption block and a register, are used,
the encryption block of an i-th (i=1 to N−1) set performs encryption in a certain step on plain text stored in the register of the i-th set or intermediate data stored in the register of the i-th set obtained from the plain text and the intermediate data obtained by the encryption is stored in the register of an (i+1)-th set and
the encryption block of an N-th set performs the encryption in the certain step on plain text stored in the register of the N-th set or intermediate data stored in the register of the N-th set obtained from the plain text and the intermediate data obtained by the encryption is stored in the register of a first set.

(Note 8)

The encryption processing method according to Note 7, wherein
the encryption on a plurality of pieces of plain text is performed simultaneously by the encryption processing method in at least a portion of time and
when the encryption in the certain step on certain plain text stored in the register of a certain set or intermediate data stored in the register of the certain set obtained from the certain plain text is performed in the encryption block of the certain set at a certain clock, the encryption in another step on other plain text stored in the register of the certain set or intermediate data stored in the register of the certain set obtained from the other plain text is performed in the encryption block of the certain set at the next clock of the certain clock.

(Note 9)

The encryption processing method according to Note 8, including:
adjusting a start time of the encryption of the other plain text so as to be shifted by a predetermined number of clocks at least with respect to the start time of the encryption of the certain plain text (timing adjustment step), wherein
when the encryption in the certain step on the certain plain text stored in the register of the certain set or intermediate data stored in the register of the certain set obtained from the certain plain text is performed in the encryption block of the certain set at the certain clock by adjustments in the timing adjustment step, the encryption in the other step on the other plain text stored in the register of the certain set or intermediate data stored in the register of the certain set obtained from the other plain text is performed in the encryption block of the certain set at the next clock of the certain clock.

(Note 10)

A decryption processing method of decrypting cipher text in a plurality of steps by using a cryptographic key, wherein N (N is an integer equal to 2 or greater) sets, each of which including a decryption block and a register, are used,
the decryption block of an i-th (i=1 to N−1) set performs decryption in a certain step on cipher text stored in the register of the i-th set or intermediate data stored in the register of the i-th set obtained from the cipher text and the intermediate data obtained by the decryption is stored in the register of an (i+1)-th set and
the decryption block of an N-th set performs the decryption in the certain step on cipher text stored in the register of the N-th set or intermediate data stored in the register of the N-th set obtained from the cipher text and the intermediate data obtained by the decryption is stored in the register of a first set.

(Note 11)

The decryption processing method according to Note 10, wherein
the decryption on a plurality of pieces of cipher text is performed simultaneously by the decryption processing method in at least a portion of time and
when the decryption in the certain step on certain cipher text stored in the register of a certain set or intermediate data stored in the register of the certain set obtained from the certain cipher text is performed in the decryption block of the certain set at a certain clock, the decryption in another step on other cipher text stored in the register of the certain set or intermediate data stored in the register of the certain set obtained from the other cipher text is performed in the decryption block of the certain set at the next clock of the certain clock.

(Note 12)

The decryption processing method according to Note 11, including:
adjusting a start time of the decryption of the other cipher text so as to be shifted by a predetermined number of clocks at least with respect to the start time of the decryption of the certain cipher text (timing adjustment step), wherein
when the decryption in the certain step on the certain cipher text stored in the register of the certain set or intermediate data stored in the register of the certain set obtained from the certain cipher text is performed in the decryption block of the certain set at the certain clock by adjustments in the timing adjustment step, the decryption in the other step on the other cipher text stored in the register of the certain set or intermediate data stored in the register of the certain set obtained from the other cipher text is performed in the decryption block of the certain set at the next clock of the certain clock.

(Note 13)

An encryption processing program causing a computer to function as an encryption processing circuit that encrypts plain text in a plurality of steps by using a cryptographic key, wherein
the encryption processing circuit includes N (N is an integer equal to 2 or greater) sets, each of which including an encryption block and a register,
code is contained so that the encryption block of an i-th (i=1 to N−1) set performs encryption in a certain step on plain text stored in the register of the i-th set or intermediate data stored in the register of the i-th set obtained from the plain text and the intermediate data obtained by the encryption is stored in the register of an (i+1)-th set in the encryption processing circuit and
code is contained so that the encryption block of an N-th set performs the encryption in the certain step on plain text stored in the register of the N-th set or intermediate data stored in the register of the N-th set obtained from the plain text and the intermediate data obtained by the encryption is stored in the register of a first set in the encryption processing circuit.

(Note 14)

The encryption processing program according to Note 13, wherein
code is further contained so that the encryption on a plurality of pieces of plain text is performed simultaneously by the encryption processing circuit in at least a portion of time and
when the encryption in the certain step on certain plain text stored in the register of a certain set or intermediate data stored in the register of the certain set obtained from the certain plain text is performed in the encryption block of the certain set at a certain clock, the encryption in another step on other plain text stored in the register of the certain set or intermediate data stored in the register of the certain set obtained from the other plain text is performed in the encryption block of the certain set at the next clock of the certain clock.

(Note 15)

The encryption processing program according to Note 14, wherein
the computer is further caused to function as a timing adjustment unit that adjusts a start time of the encryption of the other plain text so as to be shifted by a predetermined number of clocks at least with respect to the start time of the encryption of the certain plain text and
when the encryption in the certain step on the certain plain text stored in the register of the certain set or intermediate data stored in the register of the certain set obtained from the certain plain text is performed in the encryption block of the certain set at the certain clock by adjustments of the timing adjustment unit, the encryption in the other step on the other plain text stored in the register of the certain set or intermediate data stored in the register of the certain set obtained from the other plain text is performed in the encryption block of the certain set at the next clock of the certain clock.

(Note 16)

A decryption processing program causing a computer to function as a decryption processing circuit that decrypts cipher text in a plurality of steps by using a cryptographic key, wherein
the decryption processing circuit includes N (N is an integer equal to 2 or greater) sets, each of which including a decryption block and a register,
code is contained so that the decryption block of an i-th (i=1 to N−1) set performs decryption in a certain step on cipher text stored in the register of the i-th set or intermediate data stored in the register of the i-th set obtained from the cipher text and the intermediate data obtained by the decryption is stored in the register of an (i+1)-th set in the decryption processing circuit and
code is contained so that the decryption block of an N-th set performs the decryption in the certain step on cipher text stored in the register of the N-th set or intermediate data stored in the register of the N-th set obtained from the cipher text and the intermediate data obtained by the decryption is stored in the register of a first set in the decryption processing circuit.

(Note 17)

The decryption processing program according to Note 16, wherein
code is further contained so that the decryption on a plurality of pieces of cipher text is performed simultaneously by the decryption processing circuit in at least a portion of time and when the decryption in the certain step on certain cipher text stored in the register of a certain set or intermediate data stored in the register of the certain set obtained from the certain cipher text is performed in the decryption block of the certain set at a certain clock, the decryption in another step on other cipher text stored in the register of the certain set or intermediate data stored in the register of the certain set obtained from the other cipher text is performed in the decryption block of the certain set at the next clock of the certain clock.

(Note 18)

The decryption processing program according to Note 17, wherein
the computer is further caused to function as a timing adjustment unit that adjusts a start time of the decryption of the other cipher text so as to be shifted by a predetermined number of clocks at least with respect to the start time of the decryption of the certain cipher text and
when the decryption in the certain step on the certain cipher text stored in the register of the certain set or intermediate data stored in the register of the certain set obtained from the certain cipher text is performed in the decryption block of the certain set at the certain clock by adjustments of the timing adjustment unit, the decryption in the other step on the other cipher text stored in the register of the certain set or intermediate data stored in the register of the certain set obtained from the other cipher text is performed in the decryption block of the certain set at the next clock of the certain clock.

The invention claimed is:

1. An encryption processing circuit that encrypts plain text in a plurality of steps by using a cryptographic key, the circuit comprising: N (N is an integer equal to 2 or greater) sets, each of which including an encryption block and a register, wherein: the encryption block of an i-th (i=1 to N−1) set performs encryption in a certain step on plain text stored in the register of the i-th set or intermediate data stored in the register of the i-th set obtained from the plain text and intermediate data obtained by the encryption is stored in the register of an (i+1)-th set, and the encryption block of an N-th set performs the encryption in a certain step on plain text stored in the register of the N-th set or intermediate data stored in the register of the N-th set obtained from the plain text and intermediate data obtained by the encryption is stored in the register of a first set, wherein: the encryption on a plurality of pieces of plain text is performed simultaneously by the encryption processing circuit in at least a portion of time, and when the encryption in the certain step on certain plain text stored in the register of a certain set or intermediate data stored in the register of the certain set obtained from the certain plain text is performed in the encryption block of the certain set at a certain clock, the encryption in another step on other plain text stored in the register of the certain set or intermediate data stored in the register of the certain set obtained from the other plain text is performed in the encryption block of the certain set at the next clock of the certain clock, further comprising: a timing adjustment unit that adjusts a start time of the encryption of the other plain text so as to be shifted by a predetermined number of clocks at least with respect to the start time of the encryption of the certain plain text, wherein when the encryption in the certain step on the certain plain text stored in the register of the certain set or intermediate data stored in the register of the certain set obtained from the certain plain text is performed in the encryption block of the certain set at the certain clock by adjustments of the timing adjustment unit, the encryption in the other step on the other plain text stored in the register of the certain set or intermediate data stored in the register of the certain set obtained from the other plain text is performed in the encryption block of the certain set at the next clock of the certain clock.

2. A decryption processing circuit that decrypts cipher text in a plurality of steps by using a cryptographic key, the circuit comprising: N (N is an integer equal to 2 or greater) sets, each of which including a decryption block and a register, wherein: the decryption block of an i-th (i=1 to N−1) set performs decryption in a certain step on cipher text stored in the register of the i-th set or intermediate data stored in the register of the i-th set obtained from the cipher text and intermediate data obtained by the decryption is stored in the register of an (i+1)-th set, and the decryption block of an N-th set performs the decryption in a certain step on cipher text stored in the register of the N-th set or intermediate data stored in the register of the N-th set obtained from the cipher text and intermediate data obtained by the decryption is stored in the register of a first set, wherein: the decryption on a plurality of pieces of cipher text is performed simultaneously by the decryption processing circuit in at least a portion of time, and when the decryption in the certain step on certain cipher text stored in the register of a certain set or intermediate data stored in the register of the certain set obtained from the certain cipher text is performed in the decryption block of the certain set at a certain clock, the decryption in another step on other cipher text stored in the register of the certain set or intermediate data stored in the register of the certain set obtained from the other cipher text is performed in the decryption block of the certain set at the next clock of the certain clock, further comprising: a timing adjustment unit that adjusts a start time of the decryption of the other cipher text so as to be shifted by a predetermined number of clocks at least with respect to the start time of the decryption of the certain cipher text, wherein when the decryption in the certain step on the certain cipher text stored in the register of the certain set or intermediate data stored in the register of the certain set obtained from the certain cipher text is performed in the decryption block of the certain set at the certain clock by adjustments of the timing adjustment unit, the decryption in the other step on the other cipher text stored in the register of the certain set or intermediate data stored in the register of the certain set obtained from the other cipher text is performed in the decryption block of the certain set at the next clock of the certain clock.

3. An encryption processing method of encrypting plain text in a plurality of steps by using a cryptographic key, wherein: N (N is an integer equal to 2 or greater) sets, each of which including an encryption block and a register, are used, the encryption block of an i-th (i=1 to N−1) set performs encryption in a certain step on plain text stored in the register of the i-th set or intermediate data stored in the register of the i-th set obtained from the plain text and intermediate data obtained by the encryption is stored in the register of an (i+1)-th set, and the encryption block of an N-th set performs the encryption in a certain step on plain text stored in the register of the N-th set or intermediate data stored in the register of the N-th set obtained from the plain text and intermediate data obtained by the encryption is stored in the register of a first set, wherein: the encryption on a plurality of pieces of plain text is performed simultaneously by the encryption processing method in at least a portion of time, and when the encryption in the certain step on certain plain text stored in the register of a certain set or intermediate data stored in the register of the certain set obtained from the certain plain text is performed in the encryption block of the certain set at a certain clock, the encryption in another step on other plain text stored in the register of the certain set or intermediate data stored in the register of the certain set obtained from the other plain text is performed in the encryption block of the certain set at the next clock of the certain clock, comprising: adjusting a start time of the encryption of the other plain text so as to be shifted by a predetermined number of clocks at least with respect to the start time of the encryption of the certain plain text (timing adjustment step), wherein when the encryption in the certain step on the certain plain text stored in the register of the certain set or intermediate data stored in the register of the certain set obtained from the certain plain text is performed in the encryption block of the certain set at the certain clock by adjustments in the timing adjustment step, the encryption in the other step on the other plain text stored in the register of the certain set or intermediate data stored in the register of the certain set obtained from the other plain text is performed in the encryption block of the certain set at the next clock of the certain clock.

4. A decryption processing method of decrypting cipher text in a plurality of steps by using a cryptographic key, wherein: N (N is an integer equal to 2 or greater) sets, each of which including a decryption block and a register, are used, the decryption block of an i-th (i=1 to N−1) set performs decryption in a certain step on cipher text stored in the register of the i-th set or intermediate data stored in the register of the i-th set obtained from the cipher text and intermediate data obtained by the decryption is stored in the register of an (i+1)-th set, and the decryption block of an N-th set performs the decryption in a certain step on cipher text stored in the register of the N-th set or intermediate data stored in the register of the N-th set obtained from the cipher text and intermediate data obtained by the decryption is stored in the register of a first set, wherein: the decryption on a plurality of pieces of cipher text is performed simultaneously by the decryption processing method in at least a portion of time, and when the decryption in the certain step on certain cipher text stored in the register of a certain set or intermediate data stored in the register of the certain set obtained from the certain cipher text is performed in the decryption block of the certain set at a certain clock, the decryption in another step on other cipher text stored in the register of the certain set or intermediate data stored in the register of the certain set obtained from the other cipher text is performed in the decryption block of the certain set at the next clock of the certain clock, comprising: adjusting a start time of the decryption of the other cipher text so as to be shifted by a predetermined number of clocks at least with respect to the start time of the decryption of the certain cipher text (timing adjustment step), wherein when the decryption in the certain step on the certain cipher text stored in the register of the certain set or intermediate data stored in the register of the certain set obtained from the certain cipher text is performed in the decryption block of the certain set at the certain clock by adjustments in the timing adjustment step, the decryption in the other step on the other cipher text stored in the register of the certain set or intermediate data stored in the register of the certain set obtained from the other cipher text is performed in the decryption block of the certain set at the next clock of the certain clock.

5. A non-transitory computer readable medium storing an encryption processing program causing a computer to function as an encryption processing circuit that encrypts plain text in a plurality of steps by using a cryptographic key, wherein: the encryption processing circuit comprises N (N is an integer equal to 2 or greater) sets, each of which including an encryption block and a register, code is contained so that the encryption block of an i-th (i=1 to N−1) set performs encryption in a certain step on plain text stored in the register of the i-th set or intermediate data stored in the register of the i-th set obtained from the plain text and intermediate data obtained by the encryption is stored in the register of an (i+1)-th set in the encryption processing circuit and code is contained so that the encryption block of an N-th set performs the encryption in a certain step on plain text stored in the register of the N-th set or intermediate data stored in the register of the N-th set obtained from the plain text and intermediate data obtained by the encryption is stored in the register of a first set in the encryption processing circuit, wherein: code is further contained so that the encryption on a plurality of pieces of plain text is performed simultaneously by the encryption processing circuit in at least a portion of time and when the encryption in the certain step on certain plain text stored in the register of a certain set or intermediate data stored in the register of the certain set obtained from the certain plain text is performed in the encryption block of the certain set at a certain clock, the encryption in another step on other plain text stored in the register of the certain set or intermediate data stored in the register of the certain set obtained from the other plain text is performed in the encryption block of the certain set at the next clock of the certain clock, wherein: the computer is further caused to function as a timing adjustment unit that adjusts a start time of the encryption of the other plain text so as to be shifted by a predetermined number of clocks at least with respect to the start time of the encryption of the certain plain text and when the encryption in the certain step on the certain plain text stored in the register of the certain set or intermediate data stored in the register of the certain set obtained from the certain plain text is performed in the encryption block of the certain set at the certain clock by adjustments of the timing adjustment unit, the encryption in the other step on the other plain text stored in the register of the certain set or intermediate data stored in the register of the certain set obtained from the other plain text is performed in the encryption block of the certain set at the next clock of the certain clock.

6. A non-transitory computer readable medium storing a decryption processing program causing a computer to function as a decryption processing circuit that decrypts cipher text in a plurality of steps by using a cryptographic key, wherein: the decryption processing circuit comprises N (N is an integer equal to 2 or greater) sets, each of which including a decryption block and a register, code is contained so that the decryption block of an i-th (i=1 to N−1) set performs decryption in a certain step on cipher text stored in the register of the i-th set or intermediate data stored in the register of the i-th set obtained from the cipher text and intermediate data obtained by the decryption is stored in the register of an (i+1)-th set in the decryption processing circuit, and code is contained so that the decryption block of an N-th set performs the decryption in a certain step on cipher text stored in the register of the N-th set or intermediate data stored in the register of the N-th set obtained from the cipher text and intermediate data obtained by the decryption is stored in the register of a first set in the decryption processing circuit, wherein: code is further contained so that the decryption on a plurality of pieces of cipher text is performed simultaneously by the decryption processing circuit in at least a portion of time, and when the decryption in the certain step on certain cipher text stored in the register of a certain set or intermediate data stored in the register of the certain set obtained from the certain cipher text is performed in the decryption block of the certain set at a certain clock, the decryption in another step on other cipher text stored in the register of the certain set or intermediate data stored in the register of the certain set obtained from the other cipher text is performed in the decryption block of the certain set at the next clock of the certain clock, wherein: the computer is further caused to function as a timing adjustment unit that adjusts a start time of the decryption of the other cipher text so as to be shifted by a predetermined number of clocks at least with respect to the start time of the decryption of the certain cipher text, and when the decryption in the certain step on the certain cipher text stored in the register of the certain set or intermediate data stored in the register of the certain set obtained from the certain cipher text is performed in the decryption block of the certain set at the certain clock by adjustments of the timing adjustment unit, the decryption in the other step on the other cipher text stored in the register of the certain set or intermediate data stored in the register of the certain set obtained from the other cipher text is performed in the decryption block of the certain set at the next clock of the certain clock.

* * * * *